United States Patent
Okamoto et al.

(10) Patent No.: US 10,845,326 B2
(45) Date of Patent: Nov. 24, 2020

(54) GAS SENSOR AND METHOD OF CONTROLLING GAS SENSOR

(71) Applicant: NGK INSULATORS, LTD., Nagoya (JP)

(72) Inventors: Taku Okamoto, Nagoya (JP); Nobukazu Ikoma, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 61 days.

(21) Appl. No.: 16/365,763

(22) Filed: Mar. 27, 2019

(65) Prior Publication Data

US 2019/0302049 A1 Oct. 3, 2019

(30) Foreign Application Priority Data

Mar. 29, 2018 (JP) ................................ 2018-064970

(51) Int. Cl.
*G01N 27/409* (2006.01)
*G01N 27/407* (2006.01)
*G01N 27/41* (2006.01)
*G01N 27/419* (2006.01)

(52) U.S. Cl.
CPC ....... *G01N 27/409* (2013.01); *G01N 27/4072* (2013.01); *G01N 27/4073* (2013.01); *G01N 27/4076* (2013.01); *G01N 27/41* (2013.01); *G01N 27/419* (2013.01)

(58) Field of Classification Search
CPC ..... G01N 27/404–407; G01N 27/4074; G01N 27/409; G01N 27/419; G01N 27/41; G01N 33/004; G01N 33/0036–0054; F01N 2560/00–20
See application file for complete search history.

(56) References Cited

FOREIGN PATENT DOCUMENTS

DE     102008006633 A1 * 7/2009 ........... G01N 27/419
WO     2017/222002 A1 12/2017

OTHER PUBLICATIONS

English Machine Translation of DE102008006633 (Year: 2008).*

\* cited by examiner

*Primary Examiner* — Gurpreet Kaur
(74) *Attorney, Agent, or Firm* — Mattingly & Malur, PC

(57) ABSTRACT

The inequality Voff<Va<Vb is satisfied, assuming that Va is a first voltage applied to a preliminary oxygen concentration control unit at a time of a first operation thereof, Vb is a second voltage applied to the preliminary oxygen concentration control unit at a time of a second operation thereof, and Voff is a voltage applied thereto at a time when the preliminary oxygen concentration control unit is stopped.

10 Claims, 10 Drawing Sheets

FIG. 8

| | NO CONCENTRATION (ppm) | NH3 CONCENTRATION (ppm) | Ip3(2) ($\mu$A) | Ip3(1) ($\mu$A) | $\Delta$ Ip3 ($\mu$A) | POINT |
|---|---|---|---|---|---|---|
| 100 ppm SYSTEM | 100 | 0.0 | 2.137 | 2.137 | 0.000 | p1 |
| | 80 | 17.6 | 2.137 | 2.103 | 0.034 | p2 |
| | 60 | 35.2 | 2.137 | 2.069 | 0.068 | p3 |
| | 40 | 52.8 | 2.137 | 2.035 | 0.102 | p4 |
| | 20 | 70.4 | 2.137 | 2.000 | 0.137 | p5 |
| | 0 | 88.0 | 2.137 | 1.966 | 0.171 | p6 |
| 50 ppm SYSTEM | 50 | 0.0 | 1.070 | 1.070 | 0.000 | p7 |
| | 40 | 8.8 | 1.070 | 1.053 | 0.017 | p8 |
| | 30 | 17.6 | 1.070 | 1.036 | 0.034 | p9 |
| | 20 | 26.4 | 1.070 | 1.019 | 0.051 | p10 |
| | 10 | 35.2 | 1.070 | 1.002 | 0.068 | p11 |
| | 0 | 44.0 | 1.070 | 0.985 | 0.085 | p12 |
| 25 ppm SYSTEM | 25 | 0.0 | 0.537 | 0.537 | 0.000 | p13 |
| | 20 | 4.4 | 0.537 | 0.528 | 0.009 | p14 |
| | 15 | 8.8 | 0.537 | 0.519 | 0.017 | p15 |
| | 10 | 13.2 | 0.537 | 0.511 | 0.026 | p16 |
| | 5 | 17.6 | 0.537 | 0.502 | 0.034 | p17 |
| | 0 | 22.0 | 0.537 | 0.494 | 0.043 | p18 |
| 0 ppm SYSTEM | 0 | 0.0 | 0.003 | 0.003 | 0.000 | p19 |
| | 0 | 20.0 | 0.488 | 0.449 | 0.039 | p20 |
| | 0 | 40.0 | 0.973 | 0.895 | 0.078 | p21 |
| | 0 | 60.0 | 1.458 | 1.342 | 0.116 | p22 |
| | 0 | 80.0 | 1.943 | 1.788 | 0.155 | p23 |
| | 0 | 100.0 | 2.428 | 2.234 | 0.194 | p24 |

10a

GAS SENSOR AND METHOD OF CONTROLLING GAS SENSOR

CROSS-REFERENCE TO RELATED APPLICATION

This application is based upon and claims the benefit of priority from Japanese Patent Application No. 2018-064970 filed on Mar. 29, 2018, the contents of which are incorporated herein by reference.

BACKGROUND OF THE INVENTION

Field of the Invention

The present invention relates to a gas sensor, which is capable of measuring respective concentrations of a plurality of target components in a gas to be measured, as well as to a method of controlling such a gas sensor.

Description of the Related Art

International Publication No. WO 2017/222002 has the object of providing a gas sensor in which it is possible to accurately measure over a prolonged period the concentration of a non-combusted component such as exhaust gas, and a plurality of target components (for example, NO, $NH_3$, etc.) that coexist in the presence of oxygen.

In order to achieve this object, the gas sensor described in International Publication No. WO 2017/222002 includes a specified component measurement unit adapted to measure the concentration of a specified component in a measurement chamber, a preliminary oxygen concentration control unit adapted to control the oxygen concentration inside a preliminary adjustment chamber, a drive control unit adapted to control driving and stopping of the preliminary oxygen concentration control unit, and a target component acquisition unit adapted to acquire concentrations of a first target component and a second target component, on the basis of a difference between sensor outputs from the specified component measurement unit at a time that the preliminary oxygen concentration control unit is driven and at a time that the preliminary oxygen concentration control unit is stopped, and one of the respective sensor outputs.

SUMMARY OF THE INVENTION

According to International Publication No. WO 2017/222002, as described above, the concentrations of the first target component and the second target component are acquired on the basis of a difference between sensor outputs from the specified component measurement unit at a time that the preliminary oxygen concentration control unit is driven and at a time that the preliminary oxygen concentration control unit is stopped, and one of the respective sensor outputs. The preliminary oxygen concentration control unit includes a solid electrolyte and two electrodes formed on both sides of the solid electrolyte, to thereby constitute a single capacitor. In particular, in the case of a large difference between a drive voltage, which is applied at a time of driving the preliminary oxygen concentration control unit, and a stop voltage (0 V), which is applied at a time that the preliminary oxygen concentration control unit is stopped, overshooting tends to occur during falling and rising of the current waveform that flows to the preliminary oxygen concentration control unit, and there is a concern that noise may be caused by such overshooting. Thus, although it may be considered to read out data after the waveform has been stabilized, time is required until the waveform becomes stabilized, leading to the concern that sensing responsiveness may be deteriorated.

The present invention has been devised taking into consideration the aforementioned problems, and has the object of providing a gas sensor and a method of controlling such a gas sensor, wherein in the gas sensor, which is capable of accurately measuring over a prolonged period of time the concentrations of a non-combusted component such as exhaust gas, and a plurality of components (for example, NO, $NH_3$, etc.) that coexist in the presence of oxygen, the generation of noise can be suppressed, and further, it is possible to enhance sensing responsiveness.

A first aspect of the present invention is a gas sensor, including a sensor element including a structural body made up from a solid electrolyte that exhibits at least oxygen ion conductivity, a gas introduction port formed in the structural body and into which a gas to be measured is introduced, an oxygen concentration adjustment chamber communicating with the gas introduction port, a measurement chamber communicating with the oxygen concentration adjustment chamber, and a preliminary adjustment chamber disposed between the gas introduction port and the oxygen concentration adjustment chamber and communicating with the gas introduction port, an oxygen concentration control unit configured to control the oxygen concentration in the oxygen concentration adjustment chamber, a temperature control unit configured to control a temperature of the sensor element, a specified component measurement unit configured to measure a concentration of a specified component inside the measurement chamber, a preliminary oxygen concentration control unit having the solid electrolyte and two electrodes formed on both sides of the solid electrolyte, and which is configured to control the oxygen concentration in the preliminary adjustment chamber, a drive control unit configured to control the preliminary oxygen concentration control unit, and a target component acquisition unit configured to acquire concentrations of a first target component and a second target component, on the basis of a difference between a sensor output from the specified component measurement unit at a time of a first operation of the preliminary oxygen concentration control unit, and a sensor output from the specified component measurement unit at a time of a second operation of the preliminary oxygen concentration control unit, and one of the respective sensor outputs, wherein the inequality Voff<Va<Vb is satisfied, where Va is a first voltage applied to the preliminary oxygen concentration control unit during the first operation thereof, Vb is a second voltage applied to the preliminary oxygen concentration control unit during the second operation thereof, and Voff is a voltage applied thereto at a time when the preliminary oxygen concentration control unit is stopped.

Consequently, in the gas sensor which is capable of accurately measuring over a prolonged period of time the concentrations of a non-combusted component such as exhaust gas, and a plurality of components (for example NO, $NH_3$, etc.) that coexist in the presence of oxygen, the generation of noise can be suppressed, and together therewith, it is possible to enhance sensing responsiveness.

In the first aspect of the present invention, when a range of the voltage applied to the preliminary oxygen concentration control unit, which is a voltage range in which, while the second target component ($NH_3$) while remaining in the form of the second target component passes through the preliminary adjustment chamber and reaches the interior of the oxygen concentration adjustment chamber, and while the first target component (NO) while remaining in the form of the first target component passes through the preliminary adjustment chamber and reaches the interior of the oxygen concentration adjustment chamber, defines a first voltage range, and when a range of the voltage applied to the preliminary oxygen concentration control unit, which is a voltage range in which, while the second target component ($NH_3$) is changed into the first target component (NO) in the preliminary adjustment chamber and reaches the interior of the oxygen concentration adjustment chamber, and while the first target component (NO) while remaining in the form of the first target component passes through the preliminary adjustment chamber and reaches the interior of the oxygen concentration adjustment chamber, defines a second voltage range, the first voltage Va preferably is included within the first voltage range, and the second voltage Vb preferably is included within the second voltage range.

In the first aspect of the present invention, under an environment in which there is supplied a first gas to be measured, which contains the first target component and does not contain the second target component, a sensor output when the voltage Voff is applied to the preliminary oxygen concentration control unit is represented by Ip3off(1), a sensor output when the first voltage Va is applied to the preliminary oxygen concentration control unit is represented by Ip3va(1), and a sensor output when the second voltage Vb is applied to the preliminary oxygen concentration control unit is represented by Ip3vb(1), and under an environment in which there is supplied a second gas to be measured, which contains the second target component and does not contain the first target component, a sensor output when the voltage Voff is applied to the preliminary oxygen concentration control unit is represented by Ip3off(2), a sensor output when the first voltage Va is applied to the preliminary oxygen concentration control unit is represented by Ip3va(2), and a sensor output when the second voltage Vb is applied to the preliminary oxygen concentration control unit is represented by Ip3vb(2), the equations Ip3off(1)−Ip3va(1)=ΔIp3(1) and Ip3off(2)−Ip3vb(2)=ΔIp3(2) are defined, and assuming that |ΔIp3(1)−ΔIp3(2)| defines a standard difference when the second voltage Vb is applied to the preliminary oxygen concentration control unit at the time of the second operation, then the value of |ΔIp3(1)−ΔIp3(2)| when the first voltage Va is applied to the preliminary oxygen concentration control unit at the time of the first operation is less than or equal to one half of the standard difference. Preferably, the value is less than or equal to one tenth ($1/10$) of the standard difference, and more preferably, is less than or equal to one hundredth ($1/100$) of the standard difference.

In the first aspect of the present invention, under an environment in which there is supplied a first gas to be measured, which contains the first target component and does not contain the second target component, a sensor output when the voltage Voff is applied to the preliminary oxygen concentration control unit is represented by Ip3off(1), a sensor output when the first voltage Va is applied to the preliminary oxygen concentration control unit is represented by Ip3va(1), and a sensor output when the second voltage Vb is applied to the preliminary oxygen concentration control unit is represented by Ip3vb(1), under an environment in which there is supplied a second gas to be measured, which contains the second target component and does not contain the first target component, a sensor output when the voltage Voff is applied to the preliminary oxygen concentration control unit is represented by Ip3off(2), a sensor output when the first voltage Va is applied to the preliminary oxygen concentration control unit is represented by Ip3va(2), and a sensor output when the second voltage Vb is applied to the preliminary oxygen concentration control unit is represented by Ip3vb(2), and assuming that Ip3off(1)−Ip3va(1)=ΔIp3(1) and Ip3off(2)−Ip3vb(2)=ΔIp3(2), then the value of |ΔIp3(1)−Ip3(2)| when the first voltage Va is applied to the preliminary oxygen concentration control unit at the time of the first operation is less than or equal to 0.05 μA. Preferably, the value is less than or equal to 0.01 μA, and more preferably, is less than or equal to 0.001 μA.

In the first aspect of the present invention, the specified component may be NO, the first target component may be NO, and the second target component may be $NH_3$.

A second aspect of the present invention is a method of controlling a gas sensor, wherein the gas sensor includes a sensor element including a structural body made up from a solid electrolyte that exhibits at least oxygen ion conductivity, a gas introduction port formed in the structural body and into which a gas to be measured is introduced, an oxygen concentration adjustment chamber communicating with the gas introduction port, a measurement chamber communicating with the oxygen concentration adjustment chamber, and a preliminary adjustment chamber disposed between the gas introduction port and the oxygen concentration adjustment chamber, and communicating with the gas introduction port, an oxygen concentration control unit configured to control the oxygen concentration in the oxygen concentration adjustment chamber, a temperature control unit configured to control a temperature of the sensor element, a specified component measurement unit configured to measure a concentration of a specified component inside the measurement chamber, a preliminary oxygen concentration control unit having the solid electrolyte and two electrodes formed on both sides of the solid electrolyte, and which is configured to control the oxygen concentration in the preliminary adjustment chamber, a drive control unit configured to control the preliminary oxygen concentration control unit, and a target component acquisition unit configured to acquire concentrations of a first target component and a second target component, on the basis of a difference between a sensor output from the specified component measurement unit at a time of a first operation of the preliminary oxygen concentration control unit, and a sensor output from the specified component measurement unit at a time of a second operation of the preliminary oxygen concentration control unit, and one of the respective sensor outputs, wherein, upon execution of the method, the inequality Voff<Va<Vb is satisfied, where Va is a first voltage applied to the preliminary oxygen concentration control unit during the first operation thereof, Vb is a second voltage applied to the preliminary oxygen concentration control unit during the second operation thereof, and Voff is a voltage applied thereto at a time when the preliminary oxygen concentration control unit is stopped.

In the second aspect of the present invention, when a range of the voltage applied to the preliminary oxygen concentration control unit, which is a voltage range in which, while the second target component while remaining in the form of the second target component passes through the preliminary adjustment chamber and reaches the interior of the oxygen concentration adjustment chamber, and while the first target component while remaining in the form of the first target component passes through the preliminary adjustment chamber and reaches the interior of the oxygen concentration adjustment chamber, defines a first voltage range, and when a range of the voltage applied to the preliminary oxygen concentration control unit, which is a voltage range in which, while the second target component is changed into the first target component in the preliminary adjustment chamber and reaches the interior of the oxygen concentration adjustment chamber, and while the first target component while remaining in the form of the first target component passes through the preliminary adjustment chamber and reaches the interior of the oxygen concentration adjustment chamber, defines a second voltage range, the first voltage Va is preferably set from within the first voltage range, and the second voltage Vb is preferably set from within the second voltage range.

In the second aspect of the present invention, under an environment in which there is supplied a first gas to be measured, which contains the first target component and does not contain the second target component, a sensor output when the voltage Voff is applied to the preliminary oxygen concentration control unit is represented by Ip3off(1), a sensor output when the first voltage Va is applied to the preliminary oxygen concentration control unit is represented by Ip3va(1), and a sensor output when the second voltage Vb is applied to the preliminary oxygen concentration control unit is represented by Ip3vb(1), and under an environment in which there is supplied a second gas to be measured, which contains the second target component and does not contain the first target component, a sensor output when the voltage Voff is applied to the preliminary oxygen concentration control unit is represented by Ip3off(2), a sensor output when the first voltage Va is applied to the preliminary oxygen concentration control unit is represented by Ip3va(2), and a sensor output when the second voltage Vb is applied to the preliminary oxygen concentration control unit is represented by Ip3vb(2), the equations Ip3off(1)−Ip3va(1)=ΔIp3(1) and Ip3off(2)−Ip3vb(2)=ΔIp3(2) are defined, and assuming that |ΔIp3(1)−ΔIp3(2)| defines a standard difference when the second voltage Vb is applied to the preliminary oxygen concentration control unit at the time of the second operation, then the value of |ΔIp3(1)−ΔIp3(2)| when the first voltage Va is applied to the preliminary oxygen concentration control unit at the time of the first operation is set to be less than or equal to one half of the standard difference. Preferably, the value is set to be less than or equal to one tenth (1/10) of the standard difference, and more preferably, is set to be less than or equal to one hundredth (1/100) of the standard difference.

In the second aspect of the present invention, under an environment in which there is supplied a first gas to be measured, which contains the first target component and does not contain the second target component, a sensor output when the voltage Voff is applied to the preliminary oxygen concentration control unit is represented by Ip3off(1), a sensor output when the first voltage Va is applied to the preliminary oxygen concentration control unit is represented by Ip3va(1), and a sensor output when the second voltage Vb is applied to the preliminary oxygen concentration control unit is represented by Ip3vb(1), under an environment in which there is supplied a second gas to be measured, which contains the second target component and does not contain the first target component, a sensor output when the voltage Voff is applied to the preliminary oxygen concentration control unit is represented by Ip3off(2), a sensor output when the first voltage Va is applied to the preliminary oxygen concentration control unit is represented by Ip3va (2), and a sensor output when the second voltage Vb is applied to the preliminary oxygen concentration control unit is represented by Ip3vb(2), and assuming that Ip3off(1)−Ip3va(1)=ΔIp3(1) and Ip3off(2)−Ip3vb(2)=Δp3(2), then the value of |ΔIp3(1)−ΔIp3(2)| when the first voltage Va is applied to the preliminary oxygen concentration control unit at the time of the first operation is set to be less than or equal to 0.05 μA. Preferably, the value is set to be less than or equal to 0.01 μA, and more preferably, is set to be less than or equal to 0.001 μA.

In the second aspect of the present invention, the specified component may be NO, the first target component may be NO, and the second target component may be $NH_3$.

In accordance with the gas sensor and the method of controlling the gas sensor according to the present invention, in the gas sensor and the method of controlling the gas sensor which are capable of accurately measuring over a prolonged period of time the concentrations of a non-combusted component such as exhaust gas, and a plurality of components (for example NO, $NH_3$, etc.) that coexist in the presence of oxygen, the generation of noise can be suppressed, while in addition, it is possible to enhance sensing responsiveness.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8 is an explanatory diagram showing the map utilized by the gas sensor in the form of a table;

DESCRIPTION OF THE PREFERRED EMBODIMENTS

Embodiments of a gas sensor and a method of controlling the gas sensor according to the present invention will be presented and described below with reference to FIGS. 1 to 10. In the present specification, the term "to" when used to indicate a numerical range is used with the implication of including the numerical values written before and after the term as a lower limit value and an upper limit value of the numerical range.

Figure 1:
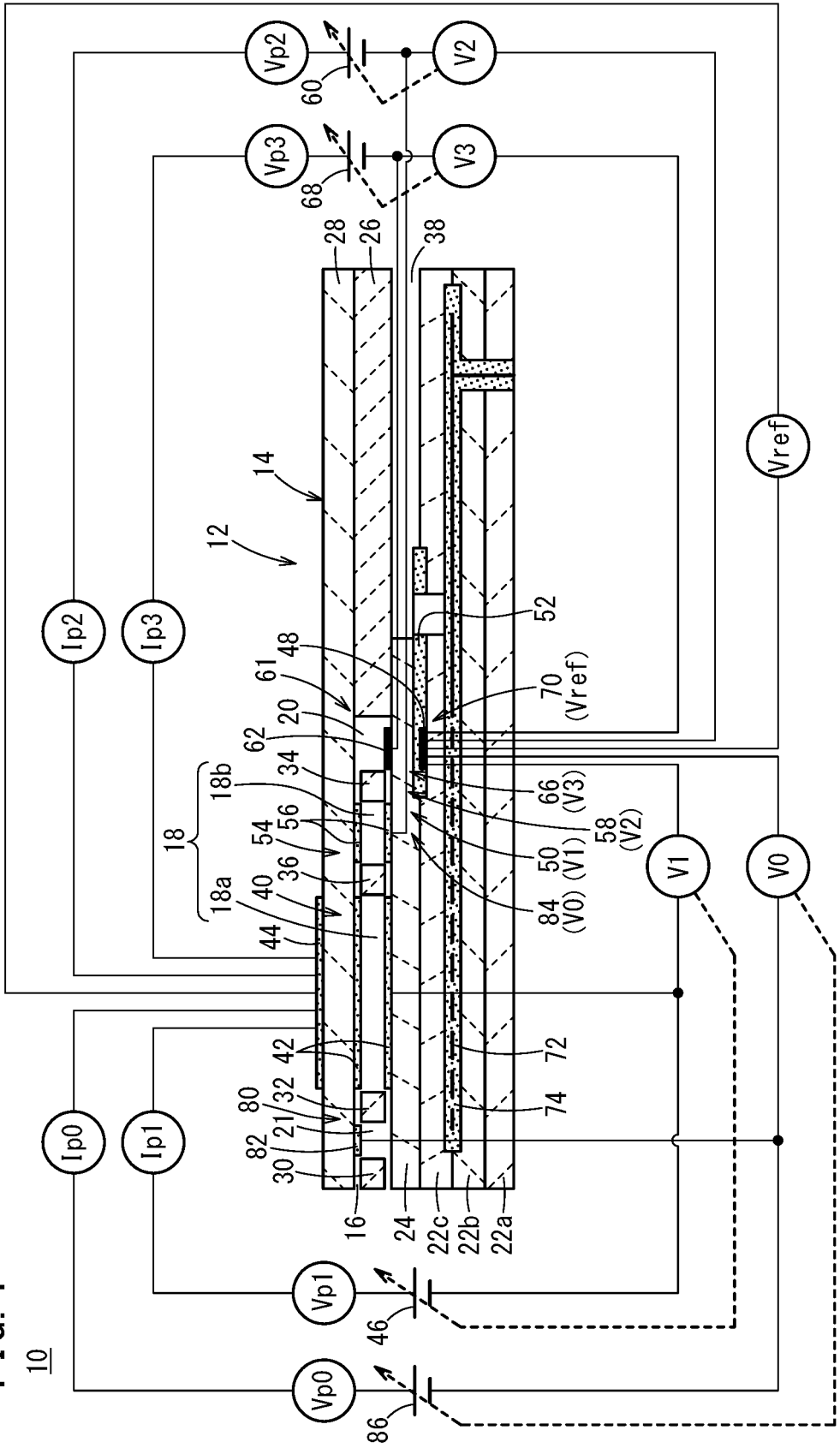
FIG. 1 is a cross-sectional view in which there is shown one structural example of a gas sensor according to the present embodiment.
Figure 2:
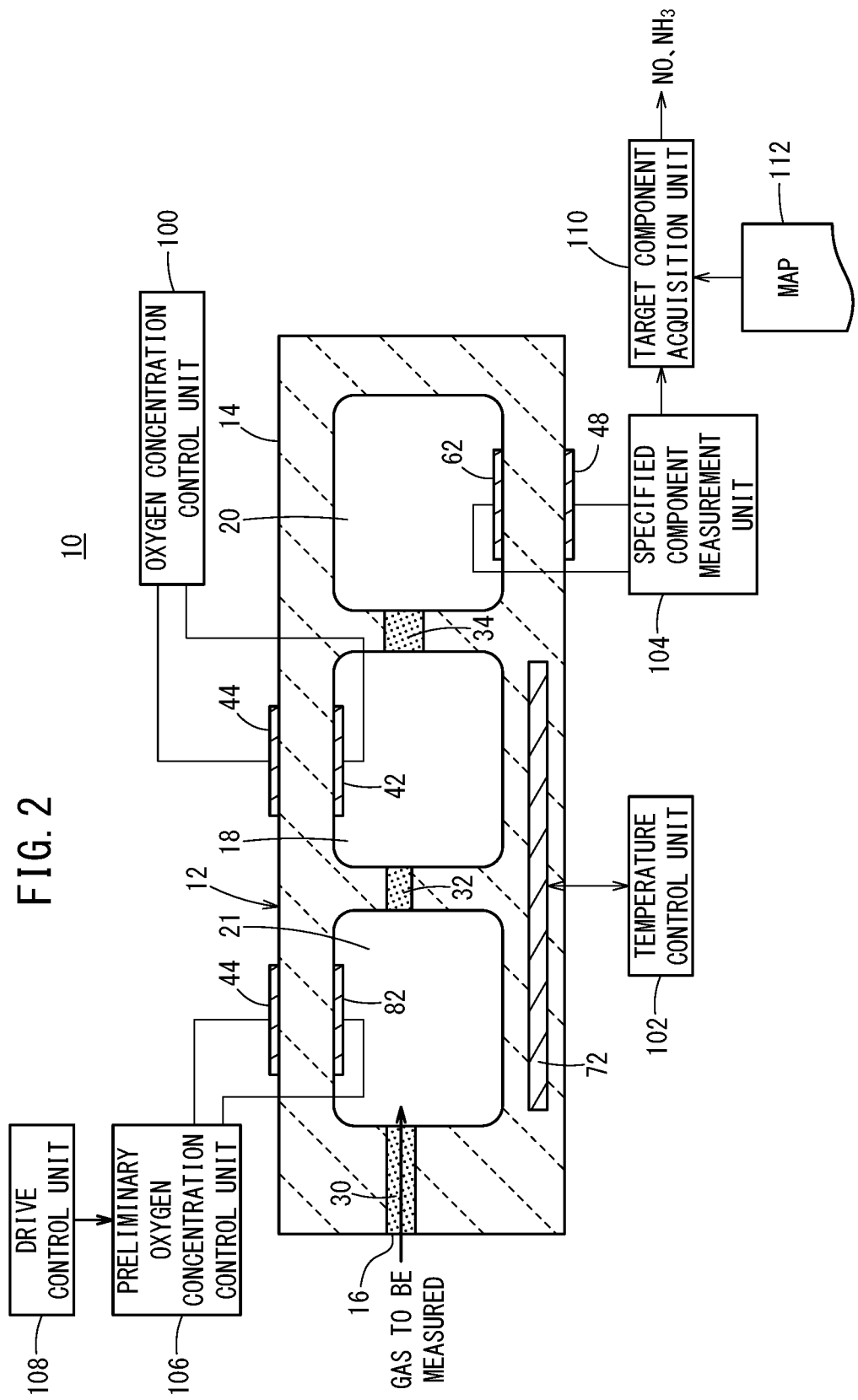
FIG. 2 is a configuration diagram schematically showing the gas sensor.

As shown in FIGS. 1 and 2, a gas sensor 10 according to the present embodiment includes a sensor element 12. The sensor element 12 includes a structural body 14 made up from a solid electrolyte that exhibits at least oxygen ion conductivity, a gas introduction port 16 formed in the structural body 14 and into which a gas to be measured is introduced, an oxygen concentration adjustment chamber 18 formed in the structural body 14 and communicating with the gas introduction port 16, and a measurement chamber 20 formed in the structural body 14 and communicating with the oxygen concentration adjustment chamber 18.

The oxygen concentration adjustment chamber 18 includes a main adjustment chamber 18a communicating with the gas introduction port 16, and an auxiliary adjustment chamber 18b communicating with the main adjustment chamber 18a. The measurement chamber 20 communicates with the auxiliary adjustment chamber 18b.

Furthermore, the gas sensor 10 includes a preliminary adjustment chamber 21 provided between the gas introduction port 16 and the main adjustment chamber 18a within the structural body 14, and which communicates with the gas introduction port 16.

More specifically, the structural body 14 of the sensor element 12 is constituted by six layers including a first substrate layer 22a, a second substrate layer 22b, a third substrate layer 22c, a first solid electrolyte layer 24, a spacer layer 26, and a second solid electrolyte layer 28, which are stacked in this order from a lower side as viewed in the drawing. The respective layers are composed respectively of an oxygen ion conductive solid electrolyte layer such as zirconia ($ZrO_2$) or the like.

Between a lower surface of the second solid electrolyte layer 28 and an upper surface of the first solid electrolyte layer 24 on a distal end side of the sensor element 12, there are provided the gas introduction port 16, a first diffusion rate control member 30, the preliminary adjustment chamber 21, a second diffusion rate control member 32, the oxygen concentration adjustment chamber 18, a third diffusion rate control member 34, and the measurement chamber 20. Further, a fourth diffusion rate control member 36 is provided between the main adjustment chamber 18a and the auxiliary adjustment chamber 18b that make up the oxygen concentration adjustment chamber 18.

The gas introduction port 16, the first diffusion rate control member 30, the preliminary adjustment chamber 21, the second diffusion rate control member 32, the main adjustment chamber 18a, the fourth diffusion rate control member 36, the auxiliary adjustment chamber 18b, the third diffusion rate control member 34, and the measurement chamber 20 are formed adjacent to each other in a manner communicating in this order. The portion from the gas introduction port 16 leading to the measurement chamber 20 is also referred to as a gas flow section.

The gas introduction port 16, the preliminary adjustment chamber 21, the main adjustment chamber 18a, the auxiliary adjustment chamber 18b, and the measurement chamber 20 are internal spaces provided by hollowing out the spacer layer 26. Any of the preliminary adjustment chamber 21, the main adjustment chamber 18a, the auxiliary adjustment chamber 18b, and the measurement chamber 20 is arranged in a manner so that respective upper parts thereof are defined by a lower surface of the second solid electrolyte layer 28, respective lower parts thereof are defined by an upper surface of the first solid electrolyte layer 24, and respective side parts thereof are defined by side surfaces of the spacer layer 26.

Any of the first diffusion rate control member 30, the third diffusion rate control member 34, and the fourth diffusion rate control member 36 is provided as two horizontally elongated slits (in which openings thereof have a longitudinal direction in a direction perpendicular to the drawing). The second diffusion rate control member 32 is provided as one horizontally elongated slit (in which an opening thereof has a longitudinal direction in a direction perpendicular to the drawing).

Further, a reference gas introduction space 38 is disposed between an upper surface of the third substrate layer 22c and a lower surface of the spacer layer 26, at a position that is farther from the distal end side than the gas flow section. The reference gas introduction space 38 is an internal space in which an upper part thereof is defined by a lower surface of the spacer layer 26, a lower part thereof is defined by an upper surface of the third substrate layer 22c, and a side part thereof is defined by a side surface of the first solid electrolyte layer 24. For example, oxygen or atmospheric air is introduced as a reference gas into the reference gas introduction space 38.

The gas introduction port 16 is a location that opens with respect to the external space, and the target gas to be measured is drawn into the sensor element 12 from the external space through the gas introduction port 16.

The first diffusion rate control member 30 is a location that imparts a predetermined diffusion resistance to the gas to be measured which is introduced from the gas introduction port 16 into the preliminary adjustment chamber 21. Details concerning the preliminary adjustment chamber 21 will be described later.

The second diffusion rate control member 32 is a location that imparts a predetermined diffusion resistance to the gas to be measured which is introduced from the preliminary adjustment chamber 21 into the main adjustment chamber 18a.

The main adjustment chamber 18a is provided as a space for the purpose of adjusting an oxygen partial pressure within the gas to be measured that is introduced from the gas introduction port 16. The oxygen partial pressure is adjusted by operation of a main pump cell 40.

The main pump cell 40 comprises an electrochemical pump cell (main electrochemical pumping cell), which is constituted by a main interior side pump electrode 42, an exterior side pump electrode 44, and an oxygen ion conductive solid electrolyte which is sandwiched between the two pump electrodes. The main interior side pump electrode 42 is provided substantially over the entire surface of an upper surface of the first solid electrolyte layer 24, a lower surface of the second solid electrolyte layer 28, and side surfaces of the spacer layer 26 that define the main adjustment chamber 18a. The exterior side pump electrode 44 is provided in a condition of being exposed to the external space in a region corresponding to the main interior side pump electrode 42 on the upper surface of the second solid electrolyte layer 28. The main interior side pump electrode 42 and the exterior side pump electrode 44 are made of a material that weakens the reduction capability with respect to the NOx component within the gas to be measured. For example, the pump electrodes are formed as porous cermet electrodes (for example, cermet electrodes of $ZrO_2$ and a noble metal such as Pt containing 0.1 to 30.0 wt % of Au) having rectangular shapes as viewed in plan.

The main pump cell 40 applies a first pump voltage Vp1 supplied from a first variable power source 46 which is provided externally of the sensor element 12, and by allowing a first pump current Ip1 to flow between the exterior side pump electrode 44 and the main interior side pump electrode 42, it is possible to pump oxygen in the interior of the main adjustment chamber 18a into the external space, or alternatively, to pump oxygen in the external space into the main adjustment chamber 18a.

Further, the sensor element 12 includes a first oxygen partial pressure detecting sensor cell 50 which is an electrochemical sensor cell. The first oxygen partial pressure detecting sensor cell 50 is constituted by the main interior side pump electrode 42, a reference electrode 48 sandwiched between the first solid electrolyte layer 24 and an upper surface of the third substrate layer 22c, and an oxygen ion conductive solid electrolyte sandwiched between these electrodes. The reference electrode 48 is an electrode having a substantially rectangular shape as viewed in plan, which is made from a porous cermet in the same manner as the exterior side pump electrode 44 and the like. Further, around the periphery of the reference electrode 48, a reference gas introduction layer 52 is provided, which is made from porous alumina and is connected to the reference gas introduction space 38. More specifically, the reference gas in the reference gas introduction space 38 is introduced to the surface of the reference electrode 48 via the reference gas introduction layer 52. The first oxygen partial pressure detecting sensor cell 50 generates a first electromotive force V1 between the main interior side pump electrode 42 and the reference electrode 48, which is caused by the difference in oxygen concentration between the atmosphere inside the main adjustment chamber 18a and the reference gas in the reference gas introduction space 38.

The first electromotive force V1 generated in the first oxygen partial pressure detecting sensor cell 50 changes depending on the oxygen partial pressure of the atmosphere existing in the main adjustment chamber 18a. In accordance with the aforementioned first electromotive force V1, the sensor element 12 feedback-controls the first variable power source 46 of the main pump cell 40. Consequently, the first pump voltage Vp1, which is applied by the first variable power source 46 to the main pump cell 40, can be controlled in accordance with the oxygen partial pressure of the atmosphere in the main adjustment chamber 18a.

The fourth diffusion rate control member 36 imparts a predetermined diffusion resistance to the gas to be measured, the oxygen concentration (oxygen partial pressure) of which is controlled by operation of the main pump cell 40 in the main adjustment chamber 18a, and is a location that guides the gas to be measured into the auxiliary adjustment chamber 18b.

The auxiliary adjustment chamber 18b is provided as a space for further carrying out adjustment of the oxygen partial pressure by an auxiliary pump cell 54, with respect to the gas to be measured which is introduced through the fourth diffusion rate control member 36, after the oxygen concentration (oxygen partial pressure) has been adjusted beforehand in the main adjustment chamber 18a. In accordance with this feature, the oxygen concentration inside the auxiliary adjustment chamber 18b can be kept constant with high accuracy, and therefore, the gas sensor 10 is made capable of measuring the NOx concentration with high accuracy.

The auxiliary pump cell 54 is an electrochemical pump cell, and is constituted by an auxiliary pump electrode 56, which is provided substantially over the entirety of the lower surface of the second solid electrolyte layer 28 facing toward the auxiliary adjustment chamber 18b, the exterior side pump electrode 44, and the second solid electrolyte layer 28.

Moreover, in the same manner as the main interior side pump electrode 42, the auxiliary pump electrode 56 is also formed using a material that weakens the reduction capability with respect to the NOx component within the gas to be measured.

The auxiliary pump cell 54, by applying a desired second pump voltage Vp2 between the auxiliary pump electrode 56 and the exterior side pump electrode 44, is capable of pumping out oxygen within the atmosphere inside the auxiliary adjustment chamber 18b into the external space, or alternatively, is capable of pumping in oxygen from the external space into the auxiliary adjustment chamber 18b.

Further, in order to control the oxygen partial pressure within the atmosphere inside the auxiliary adjustment chamber 18b, an electrochemical sensor cell, and more specifically, a second oxygen partial pressure detecting sensor cell 58 for controlling the auxiliary pump, is constituted by the auxiliary pump electrode 56, the reference electrode 48, the second solid electrolyte layer 28, the spacer layer 26, and the first solid electrolyte layer 24.

Moreover, the auxiliary pump cell 54 carries out pumping by a second variable power source 60, the voltage of which is controlled based on a second electromotive force V2 detected by the second oxygen partial pressure detecting sensor cell 58. Consequently, the oxygen partial pressure within the atmosphere inside the auxiliary adjustment chamber 18b is controlled so as to become a low partial pressure that does not substantially influence the measurement of NOx.

Further, together therewith, a second pump current Ip2 of the auxiliary pump cell 54 is used so as to control the electromotive force V1 of the second oxygen partial pressure detecting sensor cell 58. More specifically, the second pump current Ip2 is input as a control signal to the second oxygen partial pressure detecting sensor cell 58, and by controlling the second electromotive force V2, the gradient of the oxygen partial pressure within the gas to be measured, which is introduced through the fourth diffusion rate control member 36 into the auxiliary adjustment chamber 18b, is controlled so as to remain constant at all times. When the gas sensor 10 is used as a NOx sensor, by the actions of the main pump cell 40 and the auxiliary pump cell 54, the oxygen concentration inside the auxiliary adjustment chamber 18b is maintained at a predetermined value with high accuracy for each of the respective conditions.

The third diffusion rate control member 34 imparts a predetermined diffusion resistance to the gas to be measured, the oxygen concentration (oxygen partial pressure) of which is controlled by operation of the auxiliary pump cell 54 in the auxiliary adjustment chamber 18b, and is a location that guides the gas to be measured into the measurement chamber 20.

Measurement of the NOx concentration is primarily performed by operations of a measurement pump cell 61 provided in the measurement chamber 20. The measurement pump cell 61 is an electrochemical pump cell constituted by a measurement electrode 62, the exterior side pump electrode 44, the second solid electrolyte layer 28, the spacer layer 26, and the first solid electrolyte layer 24. The measurement electrode 62 is provided, for example, directly on the upper surface of the first solid electrolyte layer 24 inside the measurement chamber 20, and is a porous cermet electrode made of a material whose reduction capability with respect to the NOx component within the gas to be measured is higher than that of the main interior side pump electrode 42. The measurement electrode 62 also functions as a NOx reduction catalyst for reducing NOx existing within the atmosphere above the measurement electrode 62.

The measurement pump cell 61 is capable of pumping out oxygen that is generated by the decomposition of nitrogen oxide within the atmosphere around the periphery of the measurement electrode 62 (inside the measurement chamber 20), and can detect the generated amount as a measured pump current Ip3, or stated otherwise, as the sensor output.

Further, in order to detect the oxygen partial pressure around the periphery of the measurement electrode 62 (inside the measurement chamber 20), an electrochemical sensor cell, and more specifically, a third oxygen partial pressure detecting sensor cell 66 for controlling the measurement pump, is constituted by the first solid electrolyte layer 24, the measurement electrode 62, and the reference electrode 48. A third variable power source 68 is controlled based on a third electromotive force V3 detected by the third oxygen partial pressure detecting sensor cell 66.

The gas to be measured, which is introduced into the auxiliary adjustment chamber 18b, reaches the measurement electrode 62 inside the measurement chamber 20 through the third diffusion rate control member 34, under a condition in which the oxygen partial pressure is controlled. Nitrogen oxide existing within the gas to be measured around the periphery of the measurement electrode 62 is reduced to thereby generate oxygen. Then, the generated oxygen is subjected to pumping by the measurement pump cell 61. At this time, a third pump voltage Vp3 of the third variable power source 68 is controlled in a manner so that the third electromotive force V3 detected by the third oxygen partial pressure detecting sensor cell 66 becomes constant. The amount of oxygen generated around the periphery of the measurement electrode 62 is proportional to the concentration of nitrogen oxide within the gas to be measured. Accordingly, the nitrogen oxide concentration within the gas to be measured can be calculated using the measured pump current Ip3 of the measurement pump cell 61. More specifically, the measurement pump cell 61 constitutes a specified component measurement unit for measuring the concentration of a specified component (NO) in the measurement chamber 20.

Further, the gas sensor 10 includes an electrochemical sensor cell 70. The sensor cell 70 includes the second solid electrolyte layer 28, the spacer layer 26, the first solid electrolyte layer 24, the third substrate layer 22c, the exterior side pump electrode 44, and the reference electrode 48. In accordance with the electromotive force Vref obtained by the sensor cell 70, it is possible to detect the oxygen partial pressure within the gas to be measured existing externally of the sensor.

Furthermore, in the sensor element 12, a heater 72 is formed in a manner of being sandwiched from above and below between the second substrate layer 22b and the third substrate layer 22c. The heater 72 generates heat by being supplied with power from the exterior through a non-illustrated heater electrode provided on a lower surface of the first substrate layer 22a. As a result of the heat generated by the heater 72, the oxygen ion conductivity of the solid electrolyte that constitutes the sensor element 12 is enhanced. The heater 72 is embedded over the entire region of the preliminary adjustment chamber 21 and the oxygen concentration adjustment chamber 18, and a predetermined location of the sensor element 12 can be heated and maintained at a predetermined temperature. Moreover, a heater insulating layer 74 made of alumina or the like is formed on upper and lower surfaces of the heater 72, for the purpose of obtaining electrical insulation thereof from the second substrate layer 22b and the third substrate layer 22c (hereinafter, the heater 72, the heater electrode, and the heater insulating layer 74 may also be referred to collectively as a heater portion).

In addition, the preliminary adjustment chamber 21 is driven by a later-described drive control unit 108 (see FIG. 2), and during driving thereof, functions as a space for adjusting the oxygen partial pressure within the gas to be measured which is introduced from the gas introduction port 16. The oxygen partial pressure is adjusted by operation of a preliminary pump cell 80.

The preliminary pump cell 80 is a preliminary electrochemical pump cell, and is constituted by a preliminary pump electrode 82, which is provided substantially over the entirety of the lower surface of the second solid electrolyte layer 28 facing toward the preliminary adjustment chamber 21, the exterior side pump electrode 44, and the second solid electrolyte layer 28.

Moreover, in the same manner as the main interior side pump electrode 42, the preliminary pump electrode 82 is also formed using a material that weakens the reduction capability with respect to the NOx component within the gas to be measured.

The preliminary pump cell 80, by applying a desired preliminary voltage Vp0 between the preliminary pump electrode 82 and the exterior side pump electrode 44, is capable of pumping out oxygen within the atmosphere inside the preliminary adjustment chamber 21 into the external space, or alternatively, is capable of pumping in oxygen from the external space into the preliminary adjustment chamber 21.

Further, the gas sensor 10 includes a preliminary oxygen partial pressure detecting sensor cell 84 for controlling the preliminary pump, in order to control the oxygen partial pressure within the atmosphere inside the preliminary adjustment chamber 21. The sensor cell 84 includes the preliminary pump electrode 82, the reference electrode 48, the second solid electrolyte layer 28, the spacer layer 26, and the first solid electrolyte layer 24.

Moreover, the preliminary pump cell 80 carries out pumping by a preliminary variable power source 86, the voltage of which is controlled based on a preliminary electromotive force V0 detected by the preliminary oxygen partial pressure detecting sensor cell 84. Consequently, the oxygen partial pressure within the atmosphere inside the preliminary adjustment chamber 21 is controlled so as to become a low partial pressure that does not substantially influence the measurement of NOx.

Further, together therewith, a preliminary pump current Ip0 thereof is used so as to control the electromotive force of the preliminary oxygen partial pressure detecting sensor cell 84. More specifically, the preliminary pump current Ip0 is input as a control signal to the preliminary oxygen partial pressure detecting sensor cell 84, and by controlling the preliminary electromotive force V0, the gradient of the oxygen partial pressure within the gas to be measured, which is introduced from the first diffusion rate control member 30 into the preliminary adjustment chamber 21, is controlled so as to remain constant at all times.

The preliminary adjustment chamber 21 also functions as a buffer space. More specifically, it is possible to cancel fluctuations in the concentration of the gas to be measured, which are caused by pressure fluctuations of the gas to be measured in the external space (pulsations in the exhaust pressure, in the case that the gas to be measured is an exhaust gas of an automobile).

Furthermore, as shown schematically in FIG. 2, the gas sensor 10 includes an oxygen concentration control unit 100 that controls the oxygen concentration inside the oxygen concentration adjustment chamber 18, a temperature control unit 102 that controls the temperature of the sensor element 12, a specified component measurement unit 104 that measures the concentration of a specified component (NO) inside the measurement chamber 20, a preliminary oxygen concentration control unit 106, a drive control unit 108, and a target component acquisition unit 110.

Moreover, the oxygen concentration control unit 100, the temperature control unit 102, the specified component measurement unit 104, the preliminary oxygen concentration control unit 106, the drive control unit 108, and the target component acquisition unit 110 are constituted by one or more electronic circuits having, for example, one or a plurality of CPUs (central processing units), memory devices, and the like. The electronic circuits are software-based functional units in which predetermined functions are realized, for example, by the CPUs executing programs stored in a storage device. Of course, the electronic circuits may be constituted by an integrated circuit such as an FPGA (Field-Programmable Gate Array), in which the plurality of electronic circuits are connected according to the functions thereof.

In the conventional technique, after having carried out conversion into NO with respect to all of the target components of NO and $NH_3$ existing inside the oxygen concentration adjustment chamber 18, the target components are introduced into the measurement chamber 20, and a total amount of the two components is measured. Stated otherwise, it has been impossible to measure the concentrations of each of the two target components, that is, the respective concentrations of NO and $NH_3$.

In contrast thereto, as described above, by being equipped with the preliminary adjustment chamber 21, the preliminary oxygen concentration control unit 106, the drive control unit 108, and the target component acquisition unit 110, in addition to the oxygen concentration adjustment chamber 18, the oxygen concentration control unit 100, the temperature control unit 102, and the specified component measurement unit 104, the gas sensor 10 is made capable of acquiring the respective concentrations of NO and $NH_3$.

On the basis of the preset oxygen concentration condition, and the first electromotive force V1 generated in the first oxygen partial pressure detecting sensor cell 50 (see FIG. 1), the oxygen concentration control unit 100 feedback-controls the first variable power source 46, thereby adjusting the oxygen concentration inside the oxygen concentration adjustment chamber 18 to a concentration in accordance with the above-described condition.

The temperature control unit 102 feedback-controls the heater 72 on the basis of a preset sensor temperature condition, and the measured value from a temperature sensor (not shown) that measures the temperature of the sensor element 12, whereby the temperature of the sensor element 12 is adjusted to a temperature in accordance with the above-described condition.

By the oxygen concentration control unit 100 or the temperature control unit 102, or alternatively, by the oxygen concentration control unit 100 and the temperature control unit 102, the gas sensor 10 performs a control so as to convert all of the $NH_3$ into NO, without causing decomposition of NO inside the oxygen concentration adjustment chamber 18.

On the basis of the preset oxygen concentration condition, and the preliminary electromotive force V0 generated in the preliminary oxygen partial pressure detecting sensor cell 84 (see FIG. 1), the preliminary oxygen concentration control unit 106 feedback-controls the preliminary variable power source 86, thereby adjusting the oxygen concentration inside the preliminary adjustment chamber 21 to a concentration in accordance with the condition.

In addition, the target component acquisition unit 110 acquires the respective concentrations of NO and $NH_3$ on the basis of a difference between the sensor output from the specified component measurement unit 104 in accordance with a first operation of the preliminary oxygen concentration control unit 106, and the sensor output from the specified component measurement unit 104 in accordance with a second operation of the preliminary oxygen concentration control unit 106. The first operation and the second operation of the preliminary oxygen concentration control unit 106 will be discussed later.

In this instance, while referring to FIG. 3, a description will be given concerning changes in the measured pump current (sensor output) Ip3, and more specifically, changes in the NO concentration and the $NH_3$ concentration, with respect to the preliminary voltage Vp0, when a first gas to be measured and a second gas to be measured are supplied.

Initially, concerning the first gas to be measured, the temperature thereof is 250° C., the oxygen concentration is 0.5%, the $H_2O$ concentration is 3%, the NO concentration is 500 ppm, and the flow rate thereof is 200 liters/min. Accordingly, in the following description, the first gas to be measured will be referred to as a "first gas to be measured (NO)".

Concerning the second gas to be measured, the temperature thereof is 250° C., the oxygen concentration is 0.5%, the $H_2O$ concentration is 3%, the $NH_3$ concentration is 500 ppm, and the flow rate thereof is 200 liters/min. Accordingly, in the following description, the second gas to be measured will be referred to as a "second gas to be measured ($NH_3$)".

Figure 3:
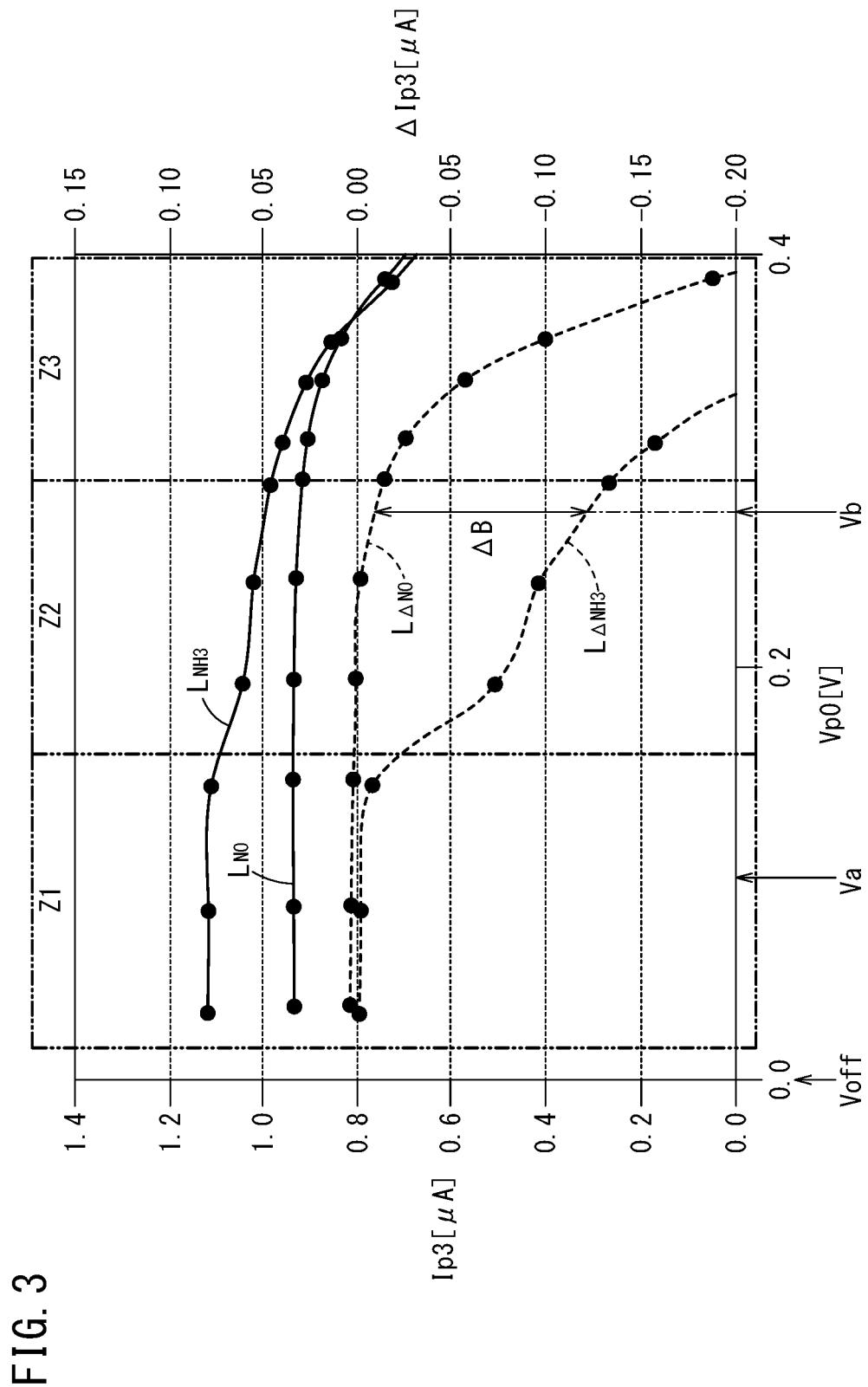
FIG. 3 is a graph showing a change in a measured pump current (sensor output) Ip3 with respect to a preliminary voltage Vp0, and showing an amount of change ΔIp3 obtained by subtracting the measured pump current Ip3, which gradually decreases accompanying an increase in the preliminary voltage Vp0, from the measured pump current Ip3 when Vp0=0 V, for each of a first gas to be measured (NO) and a second gas to be measured ($NH_3$)

In addition, a variation in the NO concentration for a case in which the first gas to be measured (NO) flows and the preliminary voltage Vp0 is made to change from 0 V to 0.4 V, and more specifically, a change in the measured pump current (sensor output) $Ip3_{NO}$ in relation to NO, is shown by the curve $L_{NO}$ in FIG. 3. Additionally, a change in the amount of change $\Delta Ip3_{NO}$, which is obtained by subtracting the measured pump current $Ip3_{NO}$, which gradually decreases accompanying an increase in the auxiliary voltage Vp0, from the measured pump current $Ip3_{NO}$ when Vp0=0 V, is shown by the curve $L_{ANO}$ in FIG. 3.

Similarly, a variation in the $NH_3$ concentration for a case in which the second gas to be measured ($NH_3$) flows and the preliminary voltage Vp0 is made to change from 0 V to 0.4 V, and more specifically, a change in the measured pump current $Ip3_{NH3}$, is shown by the curve $L_{NH3}$ in FIG. 3. Additionally, a change in the amount of change $\Delta Ip3_{NH3}$, which is obtained by subtracting the measured pump current $Ip3_{NH3}$, which gradually decreases accompanying an increase in the auxiliary voltage Vp0, from the measured pump current $Ip3_{NH3}$ when Vp0=0 V, is shown by the curve $L_{ANH3}$ in FIG. 3.

As shown by the curve $L_{ANO}$, the change in the amount of change $\Delta Ip3_{NO}$ in relation to NO remains at approximately 0 μA from the preliminary voltage Vp0 being at 0 V up to approximately 0.25 V, and the preliminary voltage Vp0 gradually decreases from 0.25 V up to approximately 0.35 V, and then steeply decreases after 0.35 V.

As shown by the curve $L_{\Delta NH3}$, the change in the amount of change $\Delta Ip3_{NH3}$ in relation to $NH_3$ remains at approximately 0 μA from the preliminary voltage Vp0 being at 0 V up to approximately 0.15 V, and the preliminary voltage Vp0 gradually decreases from 0.15 V up to approximately 0.35 V. This is because the oxidation reaction of $NH_3 \rightarrow NO$ takes place easily within the preliminary adjustment chamber 21 due to the rise in the preliminary voltage Vp0, and the $NH_3$ which is introduced through the gas introduction port 16 is converted into NO.

More specifically, in FIG. 3, a first voltage range of Vp0, which is indicated by a first region Z1, is a voltage range in which $NH_3$ while remaining in the form of $NH_3$ passes through the preliminary adjustment chamber 21 and reaches the interior of the oxygen concentration adjustment chamber 18, and in which NO while remaining in the form of NO passes through the preliminary adjustment chamber 21 and reaches the interior of the oxygen concentration adjustment chamber 18.

A second voltage range of Vp0, which is indicated by a second region Z2, is a voltage range in which $NH_3$ is changed into NO inside the preliminary adjustment chamber 21 and reaches the interior of the oxygen concentration adjustment chamber 18, and in which NO while remaining in the form of NO passes through the preliminary adjustment chamber 21 and reaches the interior of the oxygen concentration adjustment chamber 18.

A third voltage range of Vp0, which is indicated by a third region Z3, is a voltage range in which $NH_3$ after having become NO inside the preliminary adjustment chamber 21 is decomposed into $N_2$ and then reaches the interior of the oxygen concentration adjustment chamber 18, and in which NO is decomposed into $N_2$ inside the preliminary adjustment chamber 21 and then reaches the interior of the oxygen concentration adjustment chamber 18.

In addition, in the gas sensor 10, the inequality Voff<Va<Vb is satisfied, assuming that Va is the first voltage applied to the preliminary oxygen concentration control unit 106 at the time of the first operation thereof, Vb is the second voltage applied to the preliminary oxygen concentration control unit 106 at the time of the second operation thereof, and Voff is the voltage applied thereto at a time when the preliminary oxygen concentration control unit 106 is stopped.

In greater detail, the first voltage Va is set from within the aforementioned first voltage range, and the second voltage Vb is set from within the aforementioned second voltage range. Stated otherwise, the first voltage Va is included within the first voltage range, and the second voltage Vb is included within the second voltage range.

Moreover, although the second voltage Vb may be set from within the third voltage range, for example, from the standpoint of improving measurement accuracy, the second voltage Vb is preferably set from within the second voltage range.

Further, it is also preferable to have the following relationship.

Concerning the first voltage Va, a difference between the amount of change $\Delta Ip3_{NO}$ and the amount of change $\Delta Ip3_{NH3}$ when the first voltage Va is applied is less than or equal to one half ($\frac{1}{2}$), preferably is less than or equal to one tenth ($\frac{1}{10}$), and more preferably, is less than or equal to one hundredth ($\frac{1}{100}$) of the difference between the amount of change $\Delta Ip3_{NO}$ and the amount of change $\Delta Ip3_{NH3}$ when the specified second voltage Vb is applied.

Alternatively, concerning the first voltage Va, a difference between the amount of change $\Delta Ip3_{NO}$ and the amount of change $\Delta Ip3_{NH3}$ when the first voltage Va is applied is less than or equal to 0.05 μA, preferably is less than or equal to 0.01 μA, and more preferably, is less than or equal to 0.001 μA.

FIG. 3 shows an example (refer to the arrow ΔB) in which the second voltage Vb is set corresponding to 75% of the difference between the amount of change $\Delta Ip3_{NO}$ and the amount of change $\Delta Ip3_{NH3}$ when a voltage $V_{23}$ is applied corresponding to a boundary between the second region Z2 and the third region Z3, from within the second voltage range shown in the second region Z2.

More specifically, for example, as the first voltage Va, a value can be selected which is greater than or equal to 20 mV and less than 180 mV, and for example, as the second voltage, a value can be selected which is greater than or equal to 180 mV and less than or equal to 300 mV.

Figure 4A:
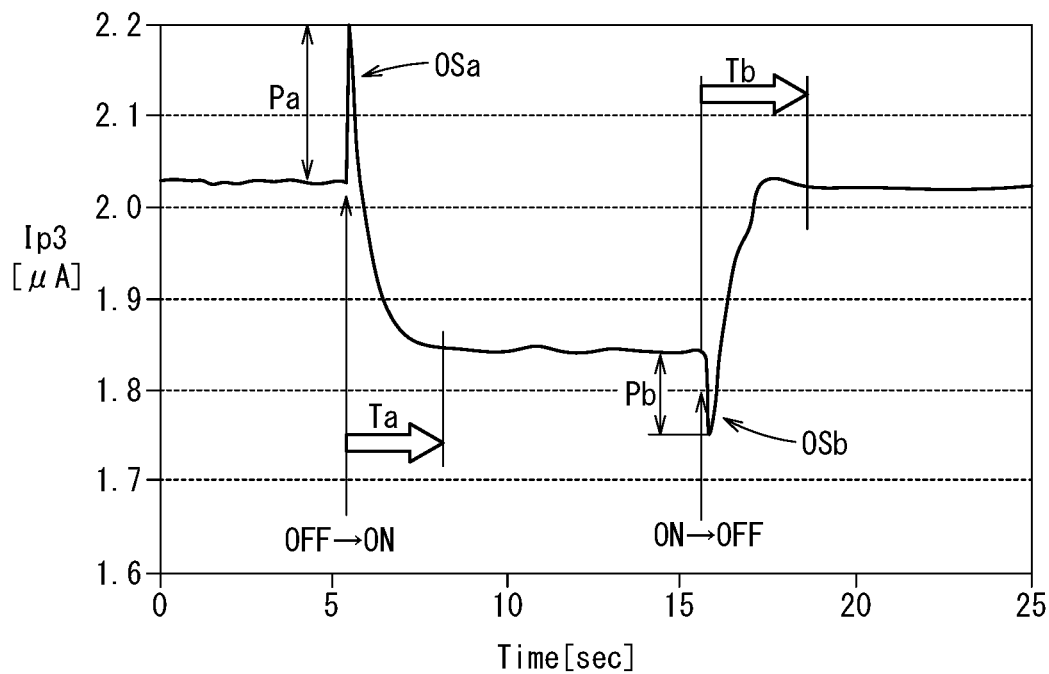
FIG. 4A is a graph showing a change in the measured pump current (sensor output) Ip3 with respect to time according to a comparative example.
Figure 4B:
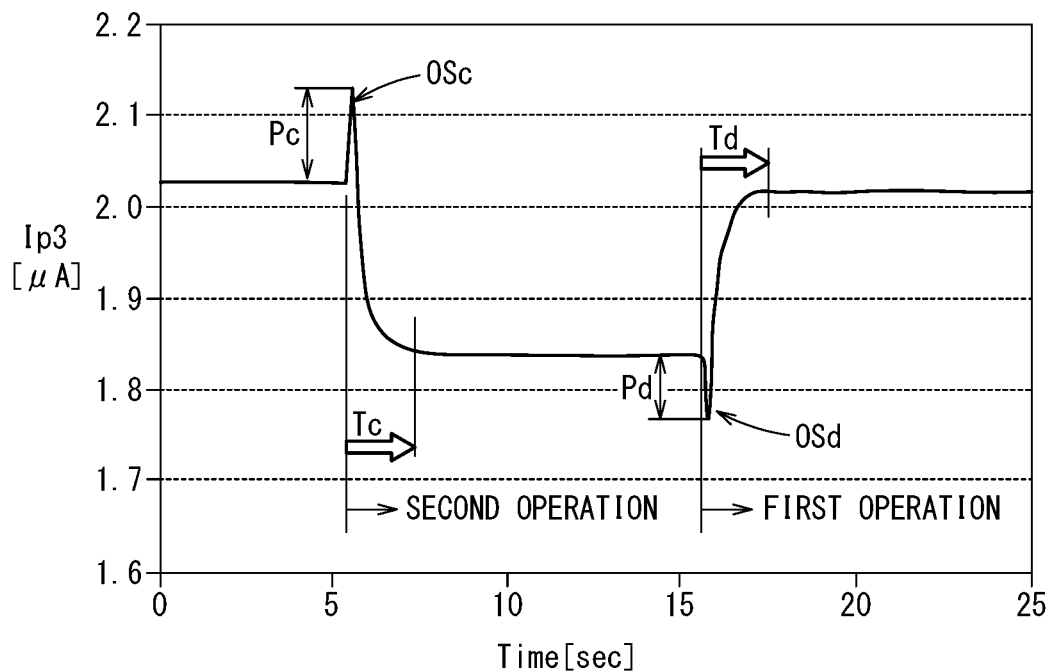
FIG. 4B is a graph showing a change in the measured pump current (sensor output) Ip3 with respect to time according to an exemplary embodiment.

In this instance, an exemplary embodiment and a comparative example will be described with reference to FIG. 4A and FIG. 4B.

In both the comparative example and the exemplary embodiment, a gas to be measured is supplied for inspection. Concerning the gas to be measured for inspection, the temperature thereof is 250° C., the oxygen concentration is 0.5%, the $H_2O$ concentration is 3%, the NO concentration is 500 ppm, the $NH_3$ concentration is 500 ppm, the flow rate thereof is 200 liters/min, and the sensor temperature is 850° C.

In addition, in the comparative example, the voltage applied at the time of driving is 270 mV, and the voltage Voff applied at the time of stopping is 0 V. On the other hand, in the exemplary embodiment, the second voltage Vb applied at the time of the second operation is 270 mV, and the first voltage Va applied at the time of the first operation is 100 mV.

First, in the comparative example, both driving and stopping of the preliminary oxygen concentration control unit 106 were controlled by the drive control unit 108, and the preliminary pump cell 80 was controlled so as to be turned ON or OFF. More specifically, after the drive control unit 108 has applied the first voltage Va and driven the preliminary oxygen concentration control unit 106, about five seconds thereafter, 0 V (=the voltage Voff) was applied to the preliminary oxygen concentration control unit 106 to cause stoppage thereof, and thereafter, after about ten seconds, the first voltage Va was applied to thereby drive the preliminary oxygen concentration control unit 106.

The target component acquisition unit 110 acquired the respective concentrations of NO and $NH_3$ on the basis of the difference between the sensor output from the specified component measurement unit 104 at the time of driving the preliminary oxygen concentration control unit 106, and the sensor output from the specified component measurement unit 104 at the time of stopping the preliminary oxygen concentration control unit 106.

At this time, the change in the measured pump current Ip3 with respect to time was measured. The result thereof is shown in FIG. 4A as a waveform of the measured pump current Ip3. From such a result, according to the comparative example, an overshoot OSa (peak Pa) occurred which rose sharply when switching from the OFF state to the ON state, and an overshoot OSb (peak Pb) occurred which fell sharply when switching from the ON state to the OFF state. Due to the occurrence of the overshoots OSa and OSb, noise was generated although it was at a low level. In addition, due to a CR time constant in accordance with the preliminary pump cell 80 which is of a capacitor structure, the falling edge and the rising edge of the waveform were delayed, and time was required until the preliminary oxygen concentration control unit 106 was placed in a stopped state. According to the comparative example, the time required to switch from the OFF state to the ON state is represented by Ta, and the time required to switch from the ON state to the OFF state is represented by Tb.

In contrast thereto, in the exemplary embodiment, the preliminary oxygen concentration control unit 106 was controlled under the first operation and the second operation by the drive control unit 108, and the preliminary pump cell 80 was controlled. More specifically, after the drive control unit 108 has applied the second voltage Vb to the preliminary oxygen concentration control unit 106 and implemented the second operation in the preliminary oxygen concentration control unit 106, about five seconds thereafter, the first voltage Va was applied to the preliminary oxygen concentration control unit 106 to implement the first operation in the preliminary oxygen concentration control unit 106, and thereafter, after about ten seconds, the second voltage Vb was applied to thereby implement the second operation in the preliminary oxygen concentration control unit 106.

In the target component acquisition unit 110, the respective concentrations of NO and $NH_3$ were acquired on the basis of the difference between the sensor output from the specified component measurement unit 104 at the time of the second operation of the preliminary oxygen concentration control unit 106, and the sensor output from the specified component measurement unit 104 at the time of the first operation of the preliminary oxygen concentration control unit 106.

At this time, the change in the measured pump current Ip3 with respect to time was measured. The result thereof is shown in FIG. 4B as a waveform of the measured pump current Ip3. From such a result, according to the exemplary embodiment, although the overshoots OSc and OSd were generated, which rise steeply when switching from the second operative state to the first operative state, and when switching from the first operative state to the second operative state, the peaks (Pc, Pd) of the overshoots were smaller than the peaks (Pa, Pb) of the comparative example, and noise was also suppressed. Further, although there was an influence on the CR time constant due to the preliminary pump cell 80 of the capacitor structure, the time required to switch from the first operative state to the second operative state is indicated by Tc, and the time required to switch from the second operative state to the first operative state is indicated by Td.

When the times Ta and Tb of the comparative example are compared with the times Tc and Td of the exemplary embodiment, the relationships Tc=(⅔)×Ta and Td=(⅔)×Tb are exhibited. More specifically, the time required to switch from the first operative state to the second operative state, and the time required to switch from the second operative state to the first operative state were completed in two thirds (⅔) of the time required by the comparative example.

From the above description, it can be appreciated that, with the exemplary embodiment, in the gas sensor 10 which is capable of accurately measuring over a prolonged period of time the concentrations of a non-combusted component such as exhaust gas, and a plurality of components (for example NO, $NH_3$, etc.) that coexist in the presence of oxygen, the generation of noise can be suppressed, and further, it is possible to enhance sensing responsiveness.

Next, processing operations of the gas sensor 10 will be described with reference also to FIGS. 5 and 6.

Figure 5:
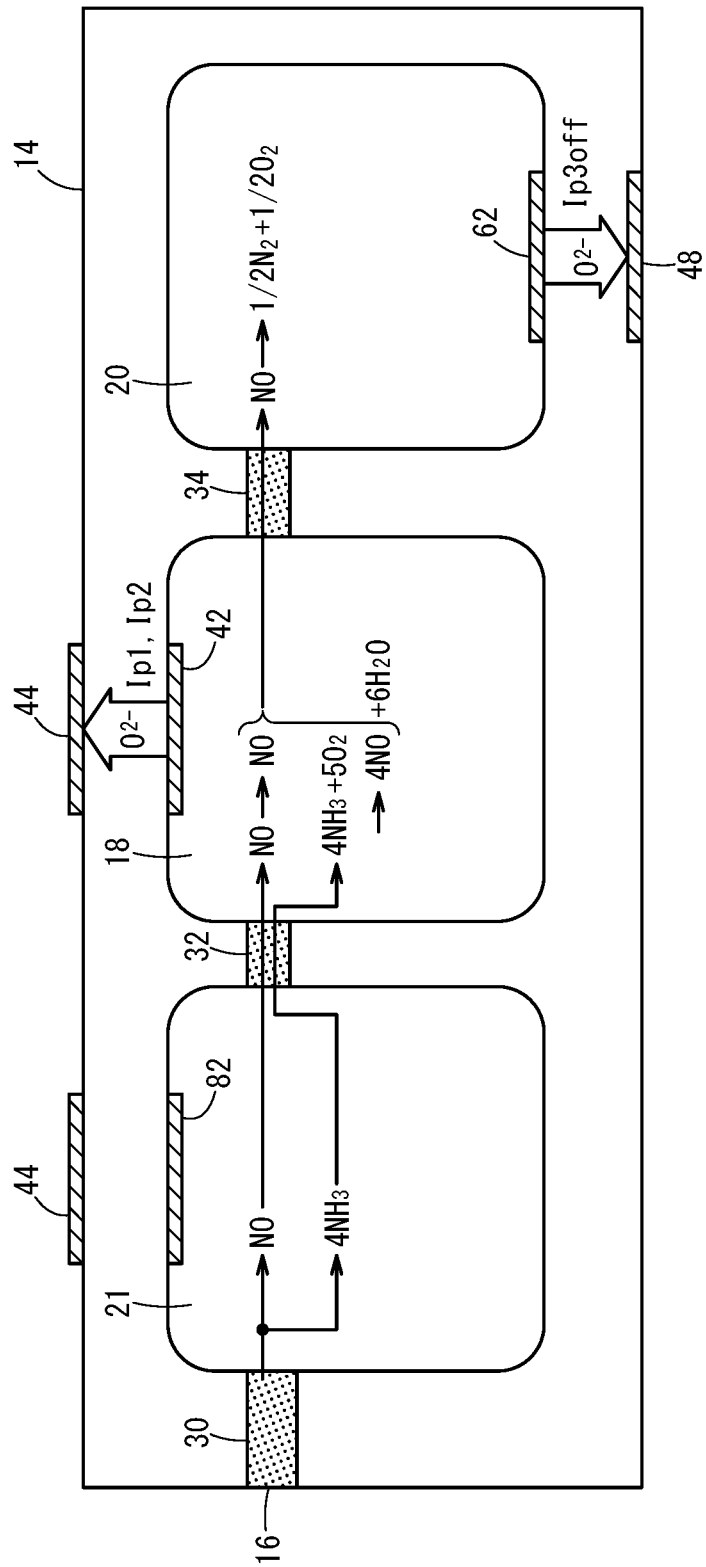
FIG. 5 is an explanatory diagram schematically showing reactions in a preliminary adjustment chamber, an oxygen concentration adjustment chamber, and a measurement chamber, for a case in which a preliminary pump cell is implementing a second operation.

First, as shown in FIG. 5, the $NH_3$ that was introduced through the gas introduction port 16 reaches the oxygen concentration adjustment chamber 18 during a period in which the preliminary oxygen concentration control unit 106 is implementing the second operation by the drive control unit 108. In the oxygen concentration adjustment chamber 18, by operation of the oxygen concentration control unit 100, a control is performed so as to convert all of the $NH_3$ into NO, and therefore, the $NH_3$ that has flowed into the oxygen concentration adjustment chamber 18 from the preliminary adjustment chamber 21 causes an oxidation reaction of $NH_3 \rightarrow NO$ to occur inside the oxygen concentration adjustment chamber 18, and all of the $NH_3$ inside the oxygen concentration adjustment chamber 18 is converted into NO. Accordingly, the $NH_3$ that was introduced through the gas introduction port 16 passes through the first diffusion rate control member 30 and the second diffusion rate control member 32 at a speed of the $NH_3$ diffusion coefficient of 2.2 $cm^2$/sec, and after being converted into NO inside the oxygen concentration adjustment chamber 18, passes through the third diffusion rate control member 34 at a speed of the NO diffusion coefficient of 1.8 $cm^2$/sec, and moves into the adjacent measurement chamber 20.

Figure 6:
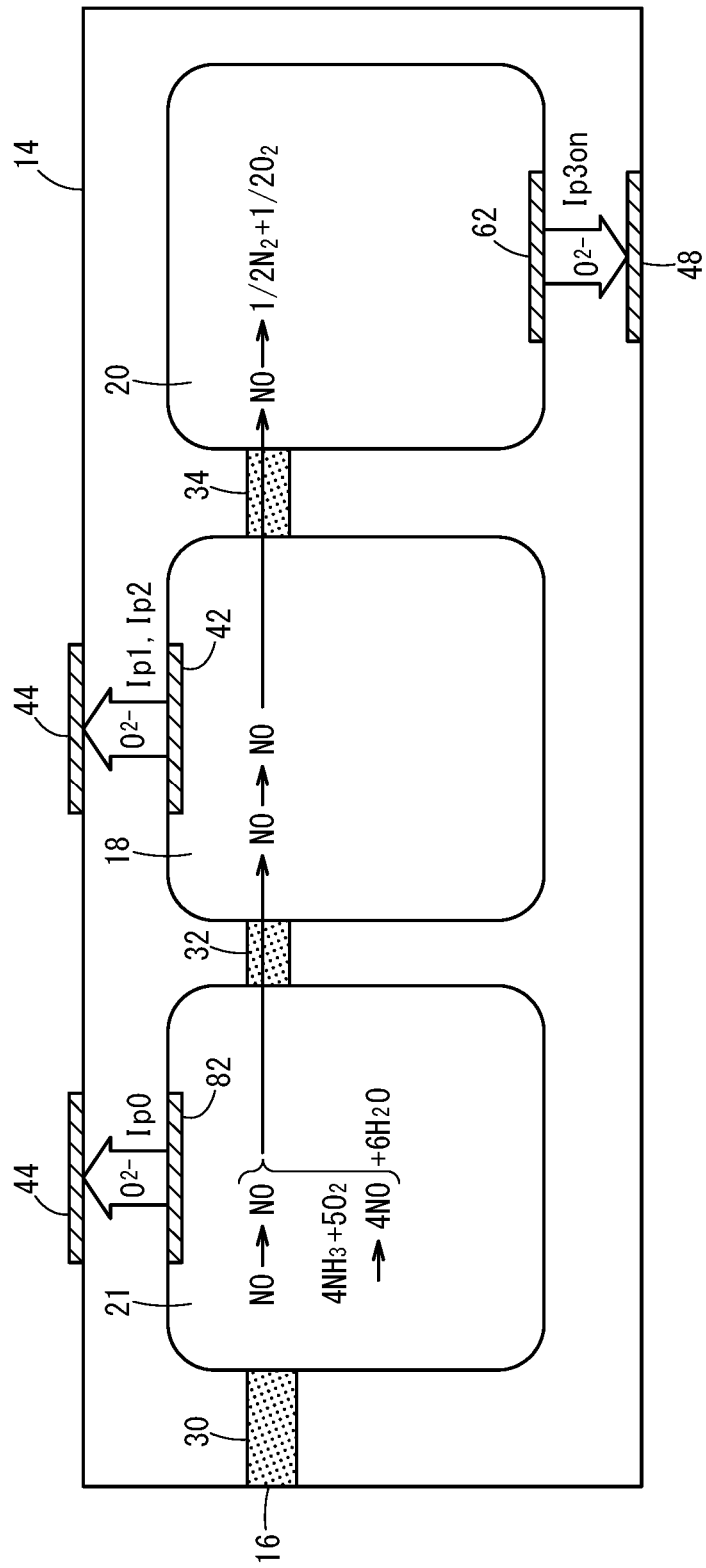
FIG. 6 is an explanatory diagram schematically showing reactions in a preliminary adjustment chamber, an oxygen concentration adjustment chamber, and a measurement chamber, for a case in which a preliminary pump cell is implementing a first operation.

On the other hand, during a period in which the preliminary oxygen concentration control unit 106 is implementing the first operation by the drive control unit 108, as shown in FIG. 6, the oxidation reaction of $NH_3 \rightarrow NO$ occurs inside the preliminary adjustment chamber 21, and all of the $NH_3$ that was introduced through the gas introduction port 16 is converted into NO. Accordingly, although the $NH_3$ passes through the first diffusion rate control member 30 at an $NH_3$ diffusion coefficient of 2.2 $cm^2$/sec, after having passed through the second diffusion rate control member 32 on the innermost side from the preliminary adjustment chamber 21, movement into the measurement chamber 20 occurs at a speed of the NO diffusion coefficient of 1.8 $cm^2$/sec.

Stated otherwise, by switching the preliminary oxygen concentration control unit 106 from the second operative state to the first operative state, the location where the oxidation reaction of $NH_3$ takes place is moved from the oxygen concentration adjustment chamber 18 to the preliminary adjustment chamber 21.

The action of moving the location where the oxidation reaction of $NH_3$ takes place from the oxygen concentration adjustment chamber 18 to the preliminary adjustment chamber 21 implies that the state when the $NH_3$ in the gas to be measured passes through the second diffusion rate control member 32 is equivalent to a state of being changed from $NH_3$ to NO. In addition, since NO and $NH_3$ possess different diffusion coefficients, the difference between passing through the second diffusion rate control member 32 with NO and passing therethrough with $NH_3$ corresponds to a difference in the amount of NO that flows into the measurement chamber 20, and therefore, the measured pump current Ip3 that flows to the measurement pump cell 61 is made to change.

In this case, the measured pump current Ip3(1) at the time of the first operation of the preliminary pump cell 80, and the amount of change ΔIp3 in the measured pump current Ip3(2) at the time of the second operation of the preliminary pump cell 80 are uniquely determined by the concentration of $NH_3$ in the gas to be measured. Therefore, it is possible to calculate the respective concentrations of NO and $NH_3$ from the measured pump current Ip3(1) or Ip3(2) when the preliminary pump cell 80 is turned ON or turned OFF, and the amount of change ΔIp3 in the aforementioned measured pump current Ip3.

Accordingly, with the target component acquisition unit 110, the respective concentrations of NO and $NH_3$ are acquired on the basis of the measured pump current Ip3(1) at the time of the first operation of the preliminary pump cell 80, the amount of change ΔIp3 between the measured pump current Ip3(1) and the measured pump current Ip3(2) at the time of the second operation of the preliminary pump cell 80, and a map 112 (see FIG. 2).

Figure 7:
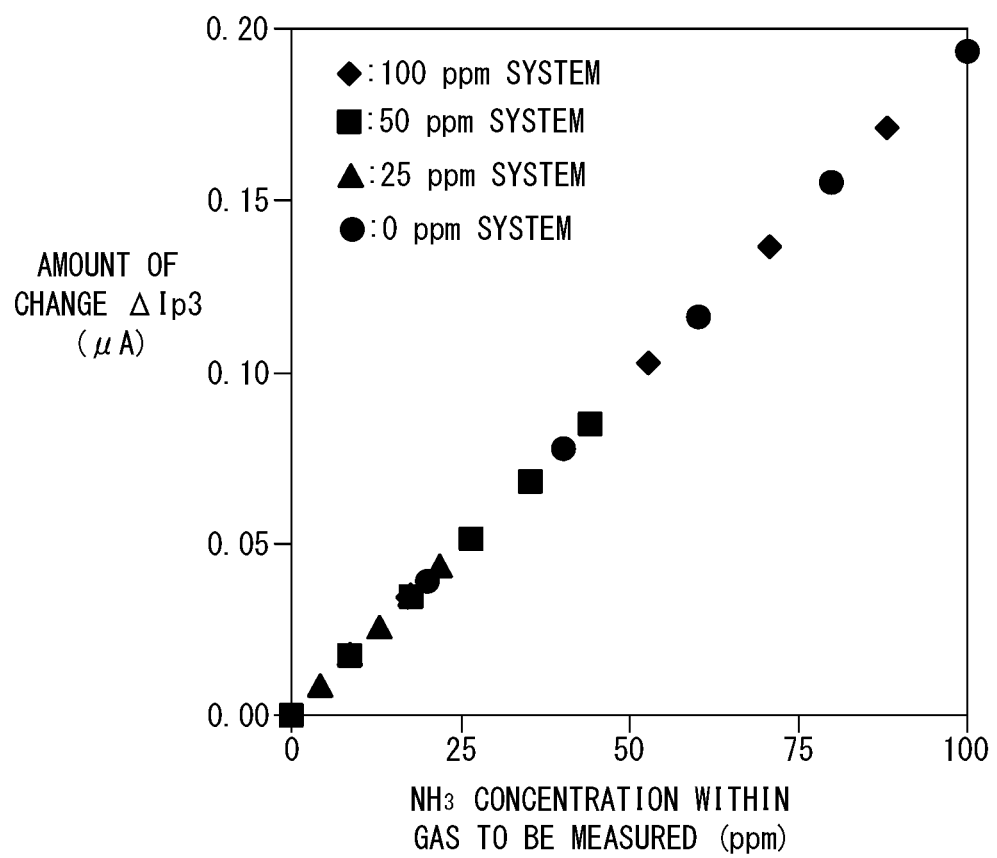
FIG. 7 is a graph showing a map utilized by the gas sensor.

When shown in the form of a graph, the map 112 becomes a graph in which, as shown in FIG. 7, the $NH_3$ concentration (ppm) within the gas to be measured is set on the horizontal axis, and there is set on the vertical axis the difference, or in other words, the amount of change ΔIp3 between the measured pump current Ip3(1) at the time of the first operation of the preliminary pump cell 80, and the measured pump current Ip3(2) at the time of the second operation of the preliminary pump cell 80. In FIG. 7, there is shown representatively a graph in which the NO concentration converted values of the measured pump current values, at the time of the second operation of the preliminary pump cell 80, are plotted as points pertaining to, for example, a 100 ppm system, a 50 ppm system, a 25 ppm system, and a 0 ppm system. When shown in the form of a table to facilitate understanding, the contents thereof are as shown in FIG. 8. These concentrations are obtained by experiment or simulation.

As can be understood from FIG. 8, by using the map 112, and on the basis of the measured pump current Ip3(2) at the time of the second operation of the preliminary pump cell 80 (i.e., a measured pump current value similar to that of a conventional serial two-chamber type NOx sensor), any one of the 100 ppm system, the 50 ppm system, the 25 ppm system, and the 0 ppm system is determined and used to identify the respective concentrations of NO and $NH_3$ based on the amount of change ΔIp3.

More specifically, by specifying a point on the map 112 from the measured pump current Ip3(2) at the time of the second operation of the preliminary pump cell 80, and the amount of change ΔIp3, it is possible to identify the NO concentration and the $NH_3$ concentration. For example, in the case that the measured pump current Ip3(2), which is similar to that of a conventional serial two-chamber type NOx sensor, is 2.137 μA, with the aforementioned serial two-chamber type NOx sensor, it could only be understood that the total concentration of NO and $NH_3$ is approximately 100 ppm. However, in the gas sensor 10, by being combined with the amount of change ΔIp3, it is possible to individually specify the NO concentration and the $NH_3$ concentration, in a manner so that the NO concentration is 100 ppm and the $NH_3$ concentration is 0 ppm at point p1, the NO concentration is 80 ppm and the $NH_3$ concentration is 17.6 ppm at point p2, and the NO concentration is 60 ppm and the $NH_3$ concentration is 35.2 ppm at point p3. If there is no corresponding point on the map 112, the point nearest thereto may be specified, and the NO concentration and the $NH_3$ concentration may be obtained, for example, by a known type of approximation calculation.

Further, the NO concentration and the $NH_3$ concentration may be obtained by the following method. More specifically, as shown in the aforementioned FIG. 7, the relationship between the amount of change ΔIp3 and the $NH_3$ concentration is obtained beforehand by experiment or simulation, and the $NH_3$ concentration is obtained from the amount of change ΔIp3 at the time of the first operation and at the time of the second operation of the preliminary pump cell 80. Then, the NO concentration may be obtained by subtracting the $NH_3$ concentration, which was obtained in the foregoing manner, from the NO concentration obtained from the sensor output at the time of the second operation of the preliminary pump cell 80, or in other words, the total NO concentration obtained by converting the total concentrations of NO and $NH_3$ into NO.

Moreover, since the magnitude of the measured pump current Ip3 indicates the amount of NO that reaches the measurement electrode 62, the amount of that gas is determined by the first diffusion rate control member 30, the second diffusion rate control member 32, the fourth diffusion rate control member 36, and the third diffusion rate control member 34. Since the gas sensors shown in FIGS. 3, 4A, and 4B are designed to have a larger diffusion resistance than that of the gas sensors as calculated in FIGS. 7 and 8, although a difference appears in the absolute value of the amount of change ΔIp3, the tendency thereof does not change, regardless of the magnitude of the diffusion resistance, insofar as they are limiting-current type gas sensors.

Next, the process of measuring NO and $NH_3$ by the gas sensor 10 will be described with reference to the flowchart of FIG. 9.

Figure 9:
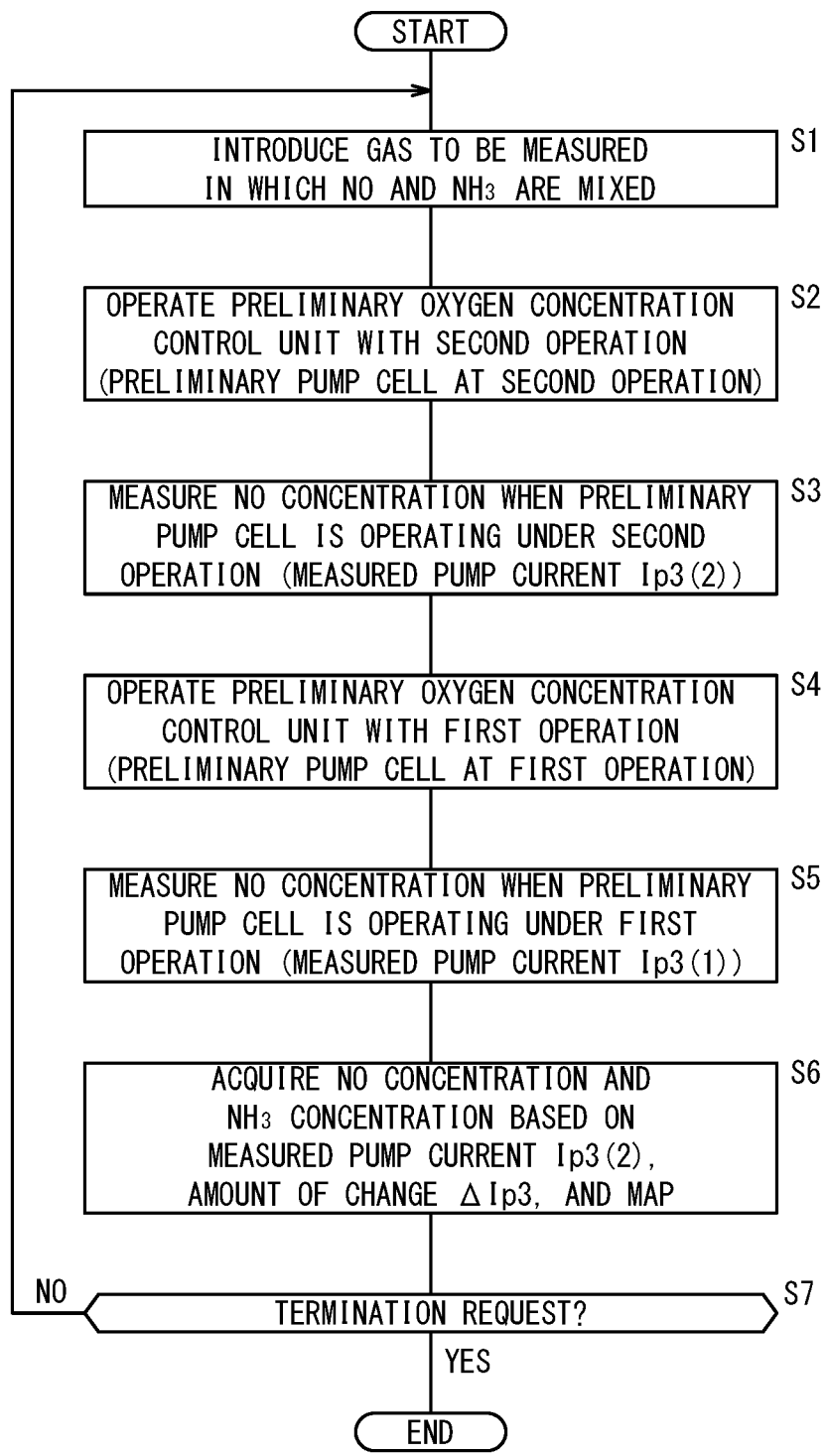
FIG. 9 is a flowchart showing an example of a method of controlling the gas sensor.
Figure 10:
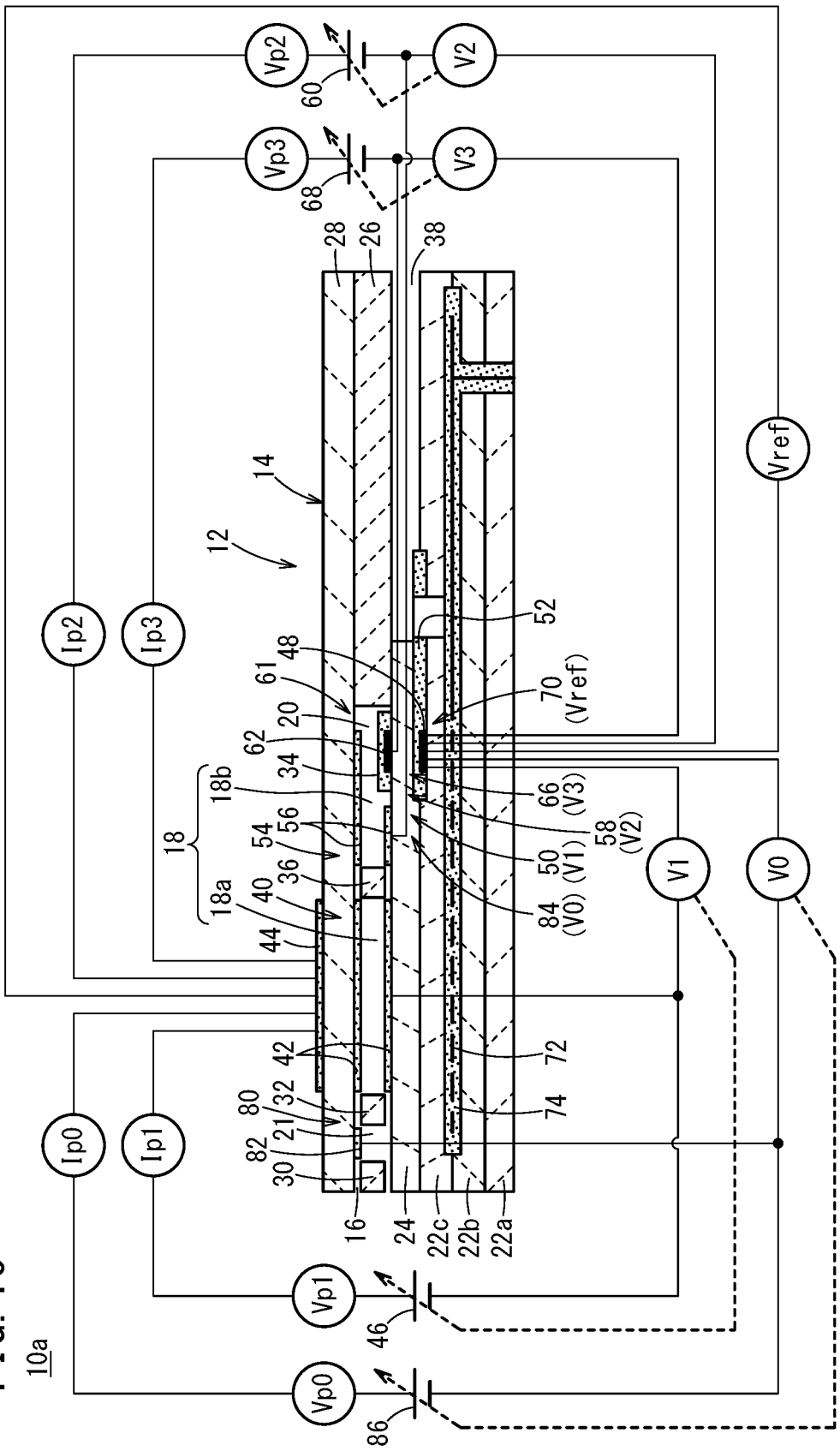
FIG. 10 is a cross-sectional view showing a structural example of a modification of the gas sensor.

First, in step S1 of FIG. 9, the gas sensor 10 introduces a gas to be measured in which NO and $NH_3$ are mixed into the preliminary adjustment chamber 21 through the gas introduction port 16.

In step S2, the drive control unit 108 applies the second voltage Vb to the preliminary oxygen concentration control unit 106. Consequently, the preliminary pump cell 80 enters the second operative state.

In step S3, the specified component measurement unit 104 measures the NO concentration at the time of the second operation of the preliminary pump cell 80. That is, the measured pump current Ip3(2) is obtained. The measured pump current Ip3(2) is input to the target component acquisition unit 110.

In step S4, the drive control unit 108 applies the first voltage Va to the preliminary oxygen concentration control unit 106. Consequently, the preliminary pump cell 80 enters the first operative state.

In step S5, the specified component measurement unit 104 measures the NO concentration at the time of the first operation of the preliminary pump cell 80. That is, the measured pump current Ip3(1) is obtained. The measured pump current Ip3(1) is input to the target component acquisition unit 110.

Accordingly, in step S6, the target component acquisition unit 110 acquires the NO concentration and the NH3 concentration on the basis of the measured pump current Ip3(2) at the time of the second operation of the preliminary pump cell 80, the amount of change ΔIp3 between the measured pump current Ip3(2) and the measured pump current Ip3(1) at the time of the first operation of the preliminary pump cell 80, and the map 112.

More specifically, the target component acquisition unit 110 specifies a point on the map 112 from the measured pump current Ip3(2) and the amount of change ΔIp3. In addition, the NO concentration and the $NH_3$ concentration corresponding to the specified point are read out from the map 112, and at this time, the concentrations are set as the measured NO concentration and the measured $NH_3$ concentration. If there is no corresponding point existing on the map 112, as was discussed above, the point nearest thereto is specified, and the NO concentration and the $NH_3$ concentration are obtained, for example, by a known type of approximation calculation.

Alternatively, based on the relationship between the amount of change $\Delta Ip3$ and the $NH_3$ concentration shown in FIG. 7, the $NH_3$ concentration is obtained from the amount of change $\Delta Ip3$ at the time of the first operation and at the time of the second operation of the preliminary pump cell 80. Then, the NO concentration may be obtained by subtracting the $NH_3$ concentration, which was obtained in the foregoing manner, from the NO concentration obtained from the sensor output at the time of the second operation of the preliminary pump cell 80, or in other words, the total NO concentration obtained by converting the total concentrations of NO and $NH_3$ into NO.

In step S7, the gas sensor 10 determines whether or not there is a termination request (power off, maintenance, etc.) to terminate the measurement process of NO and $NH_3$. If there is not a termination request, the processes from step S1 and thereafter are repeated. In addition, in step S7, at a stage at which the termination request is made, the process of measuring NO and $NH_3$ in the gas sensor 10 is brought to an end.

In this manner, the gas sensor 10 utilizes the map 112 in which there is recorded a relationship, which is measured experimentally in advance, between the NO concentration and the $NH_3$ concentration respectively for each of points specified by the sensor output (Ip3(2)) from the specified component measurement unit 104 at the time of the second operation of the preliminary oxygen concentration control unit 106, and the difference ($\Delta Ip3$) in the sensor outputs from the specified component measurement unit 104 at the time of the first operation and at the time of the second operation of the preliminary oxygen concentration control unit 106. Alternatively, as shown in FIG. 7, a relationship, which is obtained experimentally in advance, between the amount of change $\Delta Ip3$ and the $NH_3$ concentration may be used. Of course, such a feature may also be used in combination with the map 112.

In addition, the respective concentrations of NO and $NH_3$ are obtained by comparing with the map 112 the sensor output (Ip3(2)) from the specified component measurement unit 104 at the time of the second operation of the preliminary oxygen concentration control unit 106 during actual use, and the difference ($\Delta Ip3$) in the sensor outputs from the specified component measurement unit 104 at the time of the first operation and at the time of the second operation of the preliminary oxygen concentration control unit 106.

Consequently, it is possible to accurately measure the respective concentrations of a plurality of target components over a prolonged period, even under an atmosphere of a non-combusted component such as exhaust gas, and a plurality of target components (for example, NO and $NH_3$) that coexist in the presence of oxygen.

Further, merely by changing the software of the control system of the gas sensor 10, the gas sensor 10 is capable of easily realizing the process of measuring the respective concentrations of NO and $NH_3$ which heretofore could not be realized, without separately adding various measurement devices or the like as hardware. As a result, it is possible to improve the accuracy of controlling a NOx purification system and detecting failures thereof. In particular, it is possible to distinguish between NO and $NH_3$ in exhaust gas downstream of an SCR system, which contributes to precisely controlling the injected amount of urea, as well as detecting deterioration of the SCR system.

In addition, as described above, the inequality Voff<Va<Vb is satisfied, assuming that Va is the first voltage applied to the preliminary oxygen concentration control unit 106 at the time of the first operation thereof, Vb is the second voltage applied to the preliminary oxygen concentration control unit 106 at the time of the second operation thereof, and Voff is the voltage applied thereto at a time when the preliminary oxygen concentration control unit 106 is stopped. Therefore, in the gas sensor which is capable of accurately measuring over a prolonged period of time the concentrations of a non-combusted component such as exhaust gas, and a plurality of components (for example NO, $NH_3$, etc.) that coexist in the presence of oxygen, the generation of noise can be suppressed, and together therewith, it is possible to enhance sensing responsiveness.

In addition, the gas sensor 10 includes the following features.

(a) A reaction in which $NH_3$ changes into NO can be arbitrarily selected from within a range in which a variation in the sensor output can be obtained.

(b) A reaction is intentionally generated in which $NH_3$ changes into NO before and after a diffusion rate control member possessing a predetermined diffusion resistance.

(c) According to item (b), the concentration of $NH_3$ is determined from a variation in the sensor outputs caused by a difference between the diffusion coefficients of NO and $NH_3$.

(d) Furthermore, the NO concentration is obtained by comparing the total concentration of NO and $NH_3$ obtained by the sensor output itself with the concentration of $NH_3$ obtained due to the variation.

The gas sensor and the method of controlling the gas sensor according to the present invention are not limited to the embodiment described above, and it is a matter of course that various configurations could be adopted therein without deviating from the essence and gist of the present invention.

In the example discussed above, the measurement chamber 20 is disposed adjacent to the auxiliary adjustment chamber 18b, and the measurement electrode 62 is arranged inside the measurement chamber 20. However, apart therefrom, as shown in the gas sensor 10a according to the modification shown in FIG. 10, the measurement electrode 62 may be arranged inside the auxiliary adjustment chamber 18b, and may be formed as a membrane composed of a ceramic porous body such as alumina ($Al_2O_3$) serving as the third diffusion rate control member 34 so as to cover the measurement electrode 62. In this case, the surrounding periphery of the measurement electrode 62 functions as the measurement chamber 20.

Further, in the above example, an example was illustrated in which $NH_3$ as the second target component is converted into NO inside the preliminary adjustment chamber 21 at a conversion ratio of 100%. However, the conversion ratio of $NH_3$ need not necessarily be 100%, and the conversion ratio can be set arbitrarily, within a range in which a correlation with good reproducibility with the $NH_3$ concentration within the gas to be measured is obtained.

Further, driving of the preliminary oxygen concentration control unit 106 may be performed in a direction of pumping oxygen out from the interior of the preliminary adjustment chamber 21, or in a direction of pumping oxygen into the preliminary adjustment chamber 21, and it is sufficient insofar as the measured pump current Ip3, which is the output of the measurement pump cell 61, changes with good reproducibility due to the presence of $NH_3$ that serves as the second target component.

In practicing the present invention, various configurations for improving reliability may be added as components for an automobile to such an extent that the concept of the present invention is not impaired.

What is claimed is:

1. A gas sensor comprising:
a sensor element including a structural body made up from a solid electrolyte that exhibits at least oxygen ion conductivity, a gas introduction port formed in the structural body and into which a gas to be measured is introduced, an oxygen concentration adjustment chamber communicating with the gas introduction port, a measurement chamber communicating with the oxygen concentration adjustment chamber, and a preliminary adjustment chamber disposed between the gas introduction port and the oxygen concentration adjustment chamber, and communicating with the gas introduction port;
an oxygen concentration control unit configured to control an oxygen concentration in the oxygen concentration adjustment chamber;
a temperature control unit configured to control a temperature of the sensor element;
a specified component measurement unit configured to measure a concentration of a specified component inside the measurement chamber;
a preliminary oxygen concentration control unit having the solid electrolyte and two electrodes formed on both sides of the solid electrolyte, and which is configured to control the oxygen concentration in the preliminary adjustment chamber;
a drive control unit configured to control the preliminary oxygen concentration control unit; and
a target component acquisition unit configured to acquire concentrations of a first target component and a second target component, on basis of a difference between a sensor output from the specified component measurement unit at a time of a first operation of the preliminary oxygen concentration control unit, and a sensor output from the specified component measurement unit at a time of a second operation of the preliminary oxygen concentration control unit, and one of the respective sensor outputs;
wherein an inequality Voff<Va<Vb is satisfied, where Va is a first voltage applied to the preliminary oxygen concentration control unit during the first operation thereof, Vb is a second voltage applied to the preliminary oxygen concentration control unit during the second operation thereof, and Voff is a voltage applied thereto at a time when the preliminary oxygen concentration control unit is stopped.

2. The gas sensor according to claim 1, wherein:
when a range of a voltage applied to the preliminary oxygen concentration control unit, which is a voltage range in which, while the second target component while remaining in a form of the second target component passes through the preliminary adjustment chamber and reaches an interior of the oxygen concentration adjustment chamber, and while the first target component while remaining in a form of the first target component passes through the preliminary adjustment chamber and reaches the interior of the oxygen concentration adjustment chamber, defines a first voltage range; and
when a range of the voltage applied to the preliminary oxygen concentration control unit, which is a voltage range in which, while the second target component is changed into the first target component in the preliminary adjustment chamber and reaches the interior of the oxygen concentration adjustment chamber, and while the first target component while remaining in the form of the first target component passes through the preliminary adjustment chamber and reaches the interior of the oxygen concentration adjustment chamber, defines a second voltage range;
the first voltage Va is included within the first voltage range, and the second voltage Vb is included within the second voltage range.

3. The gas sensor according to claim 2, wherein:
under an environment in which there is supplied a first gas to be measured, which contains the first target component and does not contain the second target component, a sensor output when the voltage Voff is applied to the preliminary oxygen concentration control unit is represented by Ip3off(1), a sensor output when the first voltage Va is applied to the preliminary oxygen concentration control unit is represented by Ip3va(1), and a sensor output when the second voltage Vb is applied to the preliminary oxygen concentration control unit is represented by Ip3vb(1); and
under an environment in which there is supplied a second gas to be measured, which contains the second target component and does not contain the first target component, a sensor output when the voltage Voff is applied to the preliminary oxygen concentration control unit is represented by Ip3off(2), a sensor output when the first voltage Va is applied to the preliminary oxygen concentration control unit is represented by Ip3va(2), and a sensor output when the second voltage Vb is applied to the preliminary oxygen concentration control unit is represented by Ip3vb(2);
equations Ip3off(1)−Ip3va(1)=ΔIp3(1) and Ip3off(2)−Ip3vb(2)=ΔIp3(2) are defined; and
assuming that |ΔIp3(1)−ΔIp3(2)| defines a standard difference when the second voltage Vb is applied to the preliminary oxygen concentration control unit at the time of the second operation;
then |ΔIp3(1)−ΔIp3(2)| when the first voltage Va is applied to the preliminary oxygen concentration control unit at the time of the first operation is less than or equal to one half of the standard difference.

4. The gas sensor according to claim 2, wherein:
under an environment in which there is supplied a first gas to be measured, which contains the first target component and does not contain the second target component, a sensor output when the voltage Voff is applied to the preliminary oxygen concentration control unit is represented by Ip3off(1), a sensor output when the first voltage Va is applied to the preliminary oxygen concentration control unit is represented by Ip3va(1), and a sensor output when the second voltage Vb is applied to the preliminary oxygen concentration control unit is represented by Ip3vb(1);
under an environment in which there is supplied a second gas to be measured, which contains the second target component and does not contain the first target component, a sensor output when the voltage Voff is applied to the preliminary oxygen concentration control unit is represented by Ip3off(2), a sensor output when the first voltage Va is applied to the preliminary oxygen concentration control unit is represented by Ip3va(2), and a sensor output when the second voltage Vb is applied to the preliminary oxygen concentration control unit is represented by Ip3vb(2); and assuming that Ip3off(1)−Ip3va(1)=ΔIp3(1) and Ip3off(2)−Ip3vb(2)=ΔIp3(2);

then |ΔIp3(1)−ΔIp3(2)| when the first voltage Va is applied to the preliminary oxygen concentration control unit at the time of the first operation is less than or equal to 0.05 μA.

5. The gas sensor according to claim 1, wherein the specified component is NO, the first target component is NO, and the second target component is $NH_3$.

6. A method of controlling a gas sensor, wherein the gas sensor includes:
a sensor element including a structural body made up from a solid electrolyte that exhibits at least oxygen ion conductivity, a gas introduction port formed in the structural body and into which a gas to be measured is introduced, an oxygen concentration adjustment chamber communicating with the gas introduction port, a measurement chamber communicating with the oxygen concentration adjustment chamber, and a preliminary adjustment chamber disposed between the gas introduction port and the oxygen concentration adjustment chamber, and communicating with the gas introduction port;
an oxygen concentration control unit configured to control an oxygen concentration in the oxygen concentration adjustment chamber;
a temperature control unit configured to control a temperature of the sensor element;
a specified component measurement unit configured to measure a concentration of a specified component inside the measurement chamber;
a preliminary oxygen concentration control unit having the solid electrolyte and two electrodes formed on both sides of the solid electrolyte, and which is configured to control the oxygen concentration in the preliminary adjustment chamber;
a drive control unit configured to control the preliminary oxygen concentration control unit; and
a target component acquisition unit configured to acquire concentrations of a first target component and a second target component, on basis of a difference between a sensor output from the specified component measurement unit at a time of a first operation of the preliminary oxygen concentration control unit, and a sensor output from the specified component measurement unit at a time of a second operation of the preliminary oxygen concentration control unit, and one of the respective sensor outputs;
wherein, upon execution of the method, an inequality Voff<Va<Vb is satisfied, where Va is a first voltage applied to the preliminary oxygen concentration control unit during the first operation thereof, Vb is a second voltage applied to the preliminary oxygen concentration control unit during the second operation thereof, and Voff is a voltage applied thereto at a time when the preliminary oxygen concentration control unit is stopped.

7. The method of controlling the gas sensor according to claim 6, wherein:
when a range of a voltage applied to the preliminary oxygen concentration control unit, which is a voltage range in which, while the second target component while remaining in a form of the second target component passes through the preliminary adjustment chamber and reaches an interior of the oxygen concentration adjustment chamber, and while the first target component while remaining in a form of the first target component passes through the preliminary adjustment chamber and reaches the interior of the oxygen concentration adjustment chamber, defines a first voltage range; and
when a range of the voltage applied to the preliminary oxygen concentration control unit, which is a voltage range in which, while the second target component is changed into the first target component in the preliminary adjustment chamber and reaches the interior of the oxygen concentration adjustment chamber, and while the first target component while remaining in the form of the first target component passes through the preliminary adjustment chamber and reaches the interior of the oxygen concentration adjustment chamber, defines a second voltage range;
the first voltage Va is set from within the first voltage range, and the second voltage Vb is set from within the second voltage range.

8. The method of controlling the gas sensor according to claim 7, wherein:
under an environment in which there is supplied a first gas to be measured, which contains the first target component and does not contain the second target component, a sensor output when the voltage Voff is applied to the preliminary oxygen concentration control unit is represented by Ip3off(1), a sensor output when the first voltage Va is applied to the preliminary oxygen concentration control unit is represented by Ip3va(1), and a sensor output when the second voltage Vb is applied to the preliminary oxygen concentration control unit is represented by Ip3vb(1); and
under an environment in which there is supplied a second gas to be measured, which contains the second target component and does not contain the first target component, a sensor output when the voltage Voff is applied to the preliminary oxygen concentration control unit is represented by Ip3off(2), a sensor output when the first voltage Va is applied to the preliminary oxygen concentration control unit is represented by Ip3va(2), and a sensor output when the second voltage Vb is applied to the preliminary oxygen concentration control unit is represented by Ip3vb(2);
equations Ip3off(1)−Ip3va(1)=ΔIp3(1) and Ip3off(2)−Ip3vb(2)=ΔIp3(2) are defined; and
assuming that |Ip3(1)−ΔIp3(2)| defines a standard difference when the second voltage Vb is applied to the preliminary oxygen concentration control unit at the time of the second operation;
then |ΔIp3(1)−ΔIp3(2)| when the first voltage Va is applied to the preliminary oxygen concentration control unit at the time of the first operation is set to be less than or equal to one half of the standard difference.

9. The method of controlling the gas sensor according to claim 7, wherein:
under an environment in which there is supplied a first gas to be measured, which contains the first target component and does not contain the second target component, a sensor output when the voltage Voff is applied to the preliminary oxygen concentration control unit is represented by Ip3off(1), a sensor output when the first voltage Va is applied to the preliminary oxygen concentration control unit is represented by Ip3va(1), and a sensor output when the second voltage Vb is applied to the preliminary oxygen concentration control unit is represented by Ip3vb(1);
under an environment in which there is supplied a second gas to be measured, which contains the second target component and does not contain the first target component, a sensor output when the voltage Voff is applied to the preliminary oxygen concentration control unit is represented by Ip3off(2), a sensor output when the first voltage Va is applied to the preliminary oxygen concentration control unit is represented by Ip3va(2), and a sensor output when the second voltage Vb is applied to the preliminary oxygen concentration control unit is represented by Ip3vb(2); and assuming that Ip3off(1)−Ip3va(1)=ΔIp3(1) and Ip3off(2)−Ip3vb(2)=ΔIp3(2);

then |ΔIp3(1)−ΔIp3(2)| when the first voltage Va is applied to the preliminary oxygen concentration control unit at the time of the first operation is set to be less than or equal to 0.05 μA.

10. The method of controlling the gas sensor according to claim 6, wherein the specified component is NO, the first target component is NO, and the second target component is $NH_3$.

* * * * *